US007240827B2

(12) United States Patent
Ramachandran et al.

(10) Patent No.: US 7,240,827 B2
(45) Date of Patent: Jul. 10, 2007

(54) AUTOMATED BANKING MACHINE WITH IMPROVED RESISTANCE TO FRAUD

(75) Inventors: Natarajan Ramachandran, Uniontown, OH (US); Jeffery M. Enright, Akron, OH (US); Dale H. Blackson, Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 360 days.

(21) Appl. No.: 10/601,813

(22) Filed: Jun. 23, 2003

(65) Prior Publication Data

US 2004/0141058 A1 Jul. 22, 2004

Related U.S. Application Data

(60) Provisional application No. 60/429,478, filed on Nov. 26, 2002.

(51) Int. Cl.
*G06Q 40/00* (2006.01)

(52) U.S. Cl. .............................. 235/379; 902/8; 902/9; 902/14

(58) Field of Classification Search ................ 235/379, 235/380, 475, 375; 902/8, 9, 14
See application file for complete search history.

(56) References Cited

U.S. PATENT DOCUMENTS 4,971,077 A * 11/1990 Dominguez et al. ........ 131/108
6,367,695 B1 * 4/2002 Mair et al. .................. 235/380
6,390,367 B1 * 5/2002 Doig .......................... 235/436
6,629,643 B1 * 10/2003 Nagata et al. ............. 235/475

* cited by examiner

*Primary Examiner*—Daniel A. Hess
(74) *Attorney, Agent, or Firm*—Ralph E. Jocke; Daniel D. Wasil; Walker & Jocke

(57) ABSTRACT

An automated banking machine (10) includes a lockable first fascia portion (20) which when unlocked enables access to a chest lock input device (104), inputs to which enable opening a chest door (18) of the machine. Opening the first fascia portion also enables access to an actuator (116) which enables moving a second fascia portion (22) for conducting service activities. A baffle structure (164) is positioned on the housing adjacent the second fascia portion to enable cooling air flow within the housing of the machine and to prevent the introduction of moisture into the housing. A controller (72) in the machine selectively illuminates light emitting devices (118, 126) for purposes of facilitating user operation of the machine. Sensing devices (128) adjacent a card reader slot (28) on the machine enables the controller to detect the presence of a fraud device or unauthorized card reading devices.

34 Claims, 15 Drawing Sheets

AUTOMATED BANKING MACHINE WITH IMPROVED RESISTANCE TO FRAUD

CROSS REFERENCE TO RELATED APPLICATION

This Application claims benefit pursuant to 35 U.S.C. §119(e) of Provisional Application 60/429,478 filed Nov. 26, 2002.

TECHNICAL FIELD

This invention relates to automated banking machines. Specifically this invention relates to automated banking machine apparatus, systems and methods that provide for improved reliability and serviceability.

BACKGROUND ART

Automated banking machines are known. A common type of automated banking machine used by consumers is an automated teller machine ("ATM"). ATMs enable customers to carry out banking transactions. Examples of banking transactions that are sometimes carried out with ATMs include the dispensing of cash, the making of deposits, the transfer of funds between accounts, the payment of bills, the cashing of checks, the purchase of money orders, the purchase of stamps, the purchase of tickets, the purchase of phone cards and account balance inquiries. The types of banking transactions a customer can carry out at an ATM are determined by the particular banking machine, the system in which it is connected and the programming of the machine by the entity responsible for its operation.

Other types of automated banking machines may be operated in other types of environments. For example certain types of automated banking machines may be used in a customer service environment. For example service providers may use certain types of automated banking machines for purposes of counting currency or other items that are received from or which are to be given to a customer. Other types of automated banking machines may be used to validate items which provide the customer with access, value or privileges such as tickets, vouchers, checks or other financial instruments. Other examples of automated banking machines may include machines which are operative to provide users with the right to merchandise or services in an attended or a self-service environment. For purposes of this disclosure an automated banking machine shall be deemed to include any machine may be operated to carry out transactions including transfers of value.

Automated banking machines are typically used in environments where they carry out or support the conduct of transactions. It is desirable to keep automated banking machines in operation at all appropriate times to the extent possible. If a machine should experience a malfunction, it is useful to return the machine to service as quickly as possible.

Thus, there exists a need for improvements in the operation, reliability, servicing and repair of automated banking machines.

DISCLOSURE OF INVENTION

It is an object of an exemplary embodiment of the invention to provide an automated banking machine.

It is an object of an exemplary embodiment of the invention to provide an automated banking machine which provides improved access for servicing.

It is a further object of an exemplary embodiment of the invention to provide an automated banking machine which enables controlling the temperature of machine components to extend service life.

It is a further object of an exemplary embodiment of the invention to provide an automated banking machine which provides for reliable illumination of transaction areas while facilitating servicing of the machine.

It is a further object of an exemplary embodiment of the invention to provide an automated banking machine that facilitates the detection of fraudulent activity which may be attempted at the machine.

It is a further object of an exemplary embodiment of the invention to provide an automated banking machine which improved diagnostic capabilities.

It is a further object of an exemplary embodiment of the invention to provide an automated banking machine which reduces the risk of unauthorized access to devices and operations of the machine.

Further objects of exemplary embodiments will be made apparent in the following Best Modes for Carrying Out Invention and the appended claims.

The foregoing objects are accomplished in some exemplary embodiments by an automated banking machine which is an ATM. The ATM includes a plurality of transaction function devices. In the exemplary embodiment the transaction function devices include input and output devices which are part of a user interface. In the exemplary embodiment the transaction function devices also include devices for carrying out types of banking transactions such as a currency dispenser device and a deposit accepting device. The exemplary ATM also includes at least one computer which is generally referred to herein as a controller, and which is operative to cause the operation of the transaction function devices in the machine.

In an exemplary embodiment the ATM includes a housing with a secure chest portion and an upper housing area. The chest portion houses certain transaction function devices such as the currency dispenser device. The chest portion includes a chest door which is generally secured but which is capable of being opened when unlocked by authorized persons.

In the exemplary embodiment the upper housing area includes a first portion and a second portion. Access to the first and second portions are controlled by independently movable first and second fascia portions. In the exemplary embodiment one or more devices that must be manipulated in order to unlock the chest door are positioned within the first housing area. Access to the first portion of the upper housing is controlled by a fascia lock in operative connection with the first fascia portion. Thus when servicing of devices within the chest portion is required, a servicer first accesses the first portion of the upper housing area by unlocking the fascia lock to gain access to the chest lock input devices located within the upper housing area in the first portion. Once access to the first portion is achieved, the servicer provides one or more inputs to the chest lock input device to enable unlocking the chest door. In the exemplary embodiment this may be accomplished without moving the second fascia portion or moving the transaction function devices which are located within the second portion of the upper housing area.

In some exemplary embodiments the display types used as part of the user interface of the automated banking machine generate considerable heat. The combination of the heat generated by the display as well as other devices within the housing of the machine can cause elevated temperatures within the housing. This problem may occur more frequently within machines that are located in an outdoor environment where the external temperature may often become elevated. Unduly high temperatures within the machine may cause damage to the display or other machine components, or may shorten component life.

In the exemplary embodiment the housing is provided with an air cooling opening in proximity with the display so as to facilitate a flow of cooling air therethrough. In a further exemplary embodiment a baffle structure is provided in intermediate relation between the air cooling opening and the display and other components within the machine, so as to reduce the risk of moisture and other contaminants entering the interior of the machine as well as to reduce the risk of unauthorized access. In an exemplary embodiment the baffle structure is adapted to direct moisture and other contaminants to the outside of the housing of the machine while facilitating access to the transaction function devices for servicing.

In some exemplary embodiments during operation of the ATM, the transaction areas are illuminated to facilitate operation of the machine by users. Such transaction areas include in an exemplary embodiment, recessed pockets on the machine housing from which users can receive currency to be delivered to them, as well as where a user inputs deposit items. Further in an exemplary embodiment the controller of the ATM is operative to illuminate the transaction areas at those times when the user would be expected to receive or place items in such transaction areas during the conduct of transactions. This facilitates guiding the user to the particular transaction area on the machine even when the machine is being operated during daylight hours.

In an exemplary embodiment the transaction areas are positioned on components of the machine that are relatively movable during servicing activities. To facilitate the illumination of such areas while enabling relative movement, a light transmissive window is provided adjacent to certain transaction areas in the exemplary embodiment. In an operative position of the machine the window is aligned with an illumination source located in another portion of the housing. A controller of the machine initiates illumination of the illumination source at appropriate times in the conduct of transactions which causes illumination of the transaction area. However, when servicing the machine the transaction area and the illumination source may be relatively moved without making special accommodations such as disconnecting electrical connectors or light guides in order to gain access to conduct servicing activities.

In some exemplary embodiments the capability of illuminating selected areas of the machine during certain transaction steps may be utilized in conjunction with an anti-fraud device. In an exemplary embodiment the anti-fraud device is used to reduce the risk that an unauthorized card reading device is installed externally of the machine adjacent to the card reader slot of the machine fascia. Criminals are sometimes ingenious and in the past some have produced reading devices that can intercept magnetic stripe data on cards that are being input to an ATM by a consumer. By intercepting this data, criminals may be able to conduct unauthorized transactions with the consumer's card number. Such external reading devices may be made to appear to be a part of the normal ATM fascia.

In an exemplary embodiment the housing in surrounding relation of the card reader slot is illuminated responsive to operation of the controller. In some exemplary machines the housing is operative to illuminate an area generally entirely surrounding the slot so as to make it more readily apparent to a user that an unauthorized modification or attachment to the fascia may have been made.

In some exemplary embodiments during normal operation, the illumination of the area surrounding the fascia card slot is operative to help to guide the user to the slot such during a transaction when a user is required to input or take their card. The exemplary ATM is provided with radiation sensing devices positioned adjacent to the illumination devices that are operative to illuminate the area surrounding the card reader slot. The exemplary controller is programmed to sense changes in the magnitude of radiation sensed by the one or more radiation sensing devices. The installation of an unauthorized card reading device in proximity to the card reading slot generally produces a change in the magnitude of the radiation sensed by the radiation sensing devices. The exemplary controller is programmed to recognize such changes and to take appropriate action in response thereto so as to reduce the possibility of fraud. Such action may include in some exemplary embodiments, the machine sending a status message through a network to a person to be notified of a possible fraud condition. Such actions may also include in some embodiments, warning the user of the machine to look for the installation of a possible fraud device. Of course these approaches are exemplary and in other embodiments other approaches may be used.

In some exemplary embodiments of the ATM an improved diagnostic system may be provided for authorized servicers of the machine. The improved diagnostic system may include security features so as to reduce the risk of unauthorized persons using service and diagnostic capabilities of the machine for unauthorized purposes.

In an exemplary embodiment authorized servicers are provided with a portable diagnostic article bearing computer readable instructions such as a CD. When an authorized servicer is to service the machine, the portable diagnostic article is placed into operative engagement with a diagnostic article reading device. This may include for example a CD drive located within the chest portion of the housing of the ATM. This exemplary approach may reduce the risk that persons who do not have access to the chest area are enabled to access the dianostic article reading device. However, in other embodiments other approaches may be used.

In an exemplary embodiment the diagnostic article provides to the controller of the machine one or more secret codes. The secret codes may then be manipulated through the operation of the controller to determine if the diagnostic article is authorized. In some embodiments a servicer may also be required to input identifying information through one or more input devices on the ATM. Such identifying information may also be utilized in the determination as to whether the diagnostic article is authorized. Further in some exemplary embodiments the secret codes in the diagnostic article may be date, location and/or device sensitive such that the diagnostic article with the secret codes may be employed only during particular times and/or during a particular calendar period, at particular machines or for only certain devices in the machine. Of course these security procedures are exemplary and in other embodiments other or additional approaches may be used.

In some exemplary embodiments the ATM controller responsive to authentication of the diagnostic article is operative to enable the machine to output protected diagnostic data which is stored in one or more data stores within the machine. This may include for example information concerning performance of devices, information concerning sensed malfunctions or near malfunctions, data concerning statistical operational trends of various transaction devices and/or other information that may be useful in diagnosing a malfunction of the machine and/or in preventing a future malfunction. In the exemplary embodiment this diagnostic data is stored in a protected manner in the data store of the machine so as to prevent access thereto by unauthorized persons. However, when the machine is engaged with an authorized diagnostic article such data or information based thereon is enabled to be output either through output devices on the machine such as a screen, and/or other devices such as a portable terminal or cell phone carried by a servicer.

In some exemplary embodiments the diagnostic article further includes service data which is useful in diagnosing and/or correcting problems which have or which may occur at the machine. In some embodiments the service data may be included within or interoperable with electronic service manual data which describes various features of the machine and instructions for remedial actions and preventive maintenance. In some exemplary embodiments the service data may include instructions which are operative to cause the controller within the machine to conduct at least one diagnostic test of one or more transaction devices. In some embodiments the service data may further be operative to enable the controller to output suggested remedial actions or suggest further testing based on one or more results of a diagnostic test. In some exemplary embodiments a servicer may be enabled to browse through service manual data or other information included in or on the diagnostic article so as to receive outputs that facilitate servicing and maintaining the machine.

In some exemplary embodiments the diagnostic article may include service or other data in an encrypted format. Various types of standard and nonstandard encryption may be used in various embodiments. The controller may be operative to decrypt such encrypted data so as to facilitate the output of the data from the ATM. Further in some exemplary embodiments the diagnostic article may include browser software thereon. Such browser software may be loaded from the diagnostic article to the controller of the machine and used to interpret the service data from the diagnostic article. In some embodiments the browser software may be operative to interpret embedded instructions of a nonpublic and/or nonstandard nature which may be included within the service data. This may facilitate the provision of service data on the diagnostic article while preventing access by unauthorized users. In some exemplary embodiments the diagnostic article may further include instructions or devices which prevent the permanent loading of the browser software and/or service data onto another computer and/or may operate to cause such items to be erased from memory of a computer when the diagnostic article is removed from operative engagement with a computer.

In some exemplary embodiments the diagnostic article may be utilized with computer devices that are separate from the ATM. This may include for example devices such as notebook computers, PCs, PDAs or cell phones. In such exemplary embodiments the service article may be utilized with such devices to provide access to service data thereon such as for example electronic service manuals. Security provisions may be provided in the manner previously discussed or in other manners to assure that use is not made of the diagnostic article by unauthorized users. Further, in exemplary embodiments instructions from the service article that may be operative to cause a controller of an ATM to interact with transaction function devices may be rendered inoperative when the service article is installed in connection with a computer device which is not an ATM.

As will be appreciated, the foregoing objects and examples are exemplary and embodiments of the invention need not meet all or any of the foregoing objects, and need not include all or any of the exemplary features described above. Additional aspects and embodiments within the scope of the claims will be devised by those having skill in the art based on the teachings set forth herein.

BEST MODES FOR CARRYING OUT INVENTION

Figure 1:
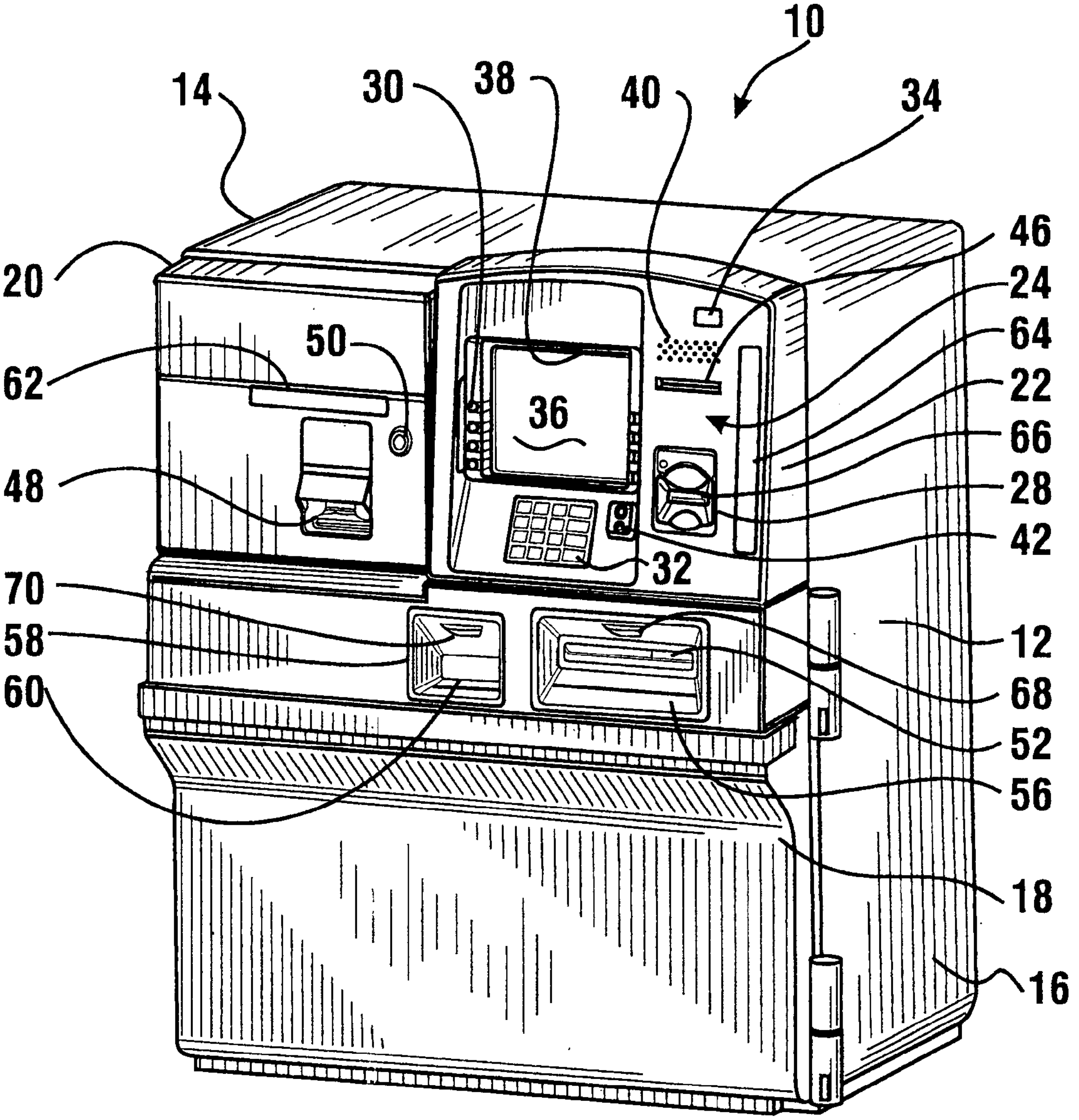
FIG. 1 is an isometric external view of an exemplary automated banking machine which is an ATM and which incorporates some aspects and features of inventions claimed in the present application.

Referring now to the drawings and particularly to FIG. 1, there is shown therein an exemplary embodiment of an automated banking machine generally indicated 10. In the exemplary embodiment automated banking machine 10 is a drive up ATM, however the features described and claimed herein are not necessarily limited to ATMs of this type. The exemplary ATM includes a housing 12. Housing 12 includes an upper housing area 14 and a secure chest area 16 in a lower portion of the housing. Access to the chest area 16 is controlled by a chest door 18 which when unlocked by authorized persons in the manner later explained, enables gaining access to the interior of the chest area.

The exemplary ATM 10 further includes a first fascia portion 20 and a second fascia portion 22. Each of the fascia portions is movably mounted relative to the housing as later explained, which in the exemplary embodiment facilitates servicing.

The ATM includes a user interface generally indicated 24. The exemplary user interface includes input devices such as a card reader 26 (shown in FIG. 3) which is in connection with a card reader slot 28 which extends in the second fascia portion. Other input devices of the exemplary user interface 24 include function keys 30 and a keypad 32. The exemplary ATM 10 also includes a camera 34 which also may serve as an input device for biometric features and the like. The exemplary user interface 24 also includes output devices such as a display 36. Display 36 is viewable by an operator of the machine when the machine is in the operative condition through an opening 38 in the second fascia portion 22. Further output devices in the exemplary user interface include a speaker 40. A headphone jack 42 also serves as an output device. The headphone jack may be connected to a headphone provided by a user who is visually impaired to provide the user with voice guidance in the operation of the machine. The exemplary machine further includes a receipt printer 44 (see FIG. 3) which is operative to provide users of the machine with receipts for transactions conducted. Transaction receipts are provided to users through a receipt delivery slot 46 which extends through the second fascia portion. Exemplary receipt printers that may be used in some embodiments are shown in U.S. Pat. No. 5,729,379 and U.S. Pat. No. 5,850,075, the disclosures of which are incorporated by reference herein. It should be understood that these input and output devices of the user interface 24 are exemplary and in other embodiments, other or different input and output devices may be used.

In the exemplary embodiment the second fascia portion has included thereon a deposit envelope providing opening 48. Deposit envelopes may be provided from the deposit envelope providing opening to users who may place deposits in the machine. The second fascia portion 20 also includes a fascia lock 50. Fascia lock 50 is in operative connection with the second fascia portion and limits access to the portion of the interior of the upper housing behind the fascia to authorized persons. In the exemplary embodiment fascia lock 50 comprises a key type lock. However, in other embodiments other types of locking mechanisms may be used. Such other types of locking mechanisms may include for example, other types of mechanical and electronic locks that are opened in response to items, inputs, signals, conditions, actions or combinations or multiples thereof.

The exemplary ATM 10 further includes a delivery area 52. Delivery area 52 is in connection with a currency dispenser device 54 which is positioned in the chest portion and is shown schematically in FIG. 3. The delivery area 52 is a transaction area on the machine in which currency sheets are delivered to a user. In the exemplary embodiment the delivery area 52 is positioned and extends within a recessed pocket 56 in the housing of the machine.

ATM 10 further includes a deposit acceptance area 58. Deposit acceptance area is an area through which deposits such as deposit envelopes to be deposited by users are placed in the machine. The deposit acceptance area 58 is in operative connection with a deposit accepting device positioned in the chest area 16 of the ATM. Exemplary types of deposit accepting devices are shown in U.S. Pat. No. 4,884,769 and U.S. Pat. No. 4,597,330, the disclosures of which are incorporated herein by reference.

In the exemplary embodiment the deposit acceptance area serves as a transaction area of the machine and is positioned and extends within a recessed pocket 60. It should be understood that while the exemplary embodiment of ATM 10 includes an envelope deposit accepting device and a currency sheet dispenser device, other or different types of transaction function devices may be included in automated banking machines and devices encompassed by the present invention. These may include for example, check and/or money order accepting devices, ticket accepting devices, stamp accepting devices, card dispensing devices, money order dispensing devices and other types of devices which are operative to carry out transaction functions.

In the exemplary embodiment the ATM 10 includes certain illuminating devices which are used to illuminate transaction areas, some of which are later discussed in detail. First fascia portion 20 includes an illumination panel 62 for illuminating the deposit envelope providing opening. Second fascia portion 22 includes an illumination panel 64 for illuminating the area of the receipt delivery slot 46 and the card reader slot 28. Further, an illuminated housing 66 later discussed in detail, bounds the card reader slot 28. Also, in the exemplary embodiment an illuminating window 68 is positioned in the recessed pocket 56 of the delivery area 52. An illuminating window 70 is positioned in the recessed pocket 60 of the deposit acceptance area 58. It should be understood that these structures and features are exemplary and in other embodiments other structures and features may be used.

Figure 3:
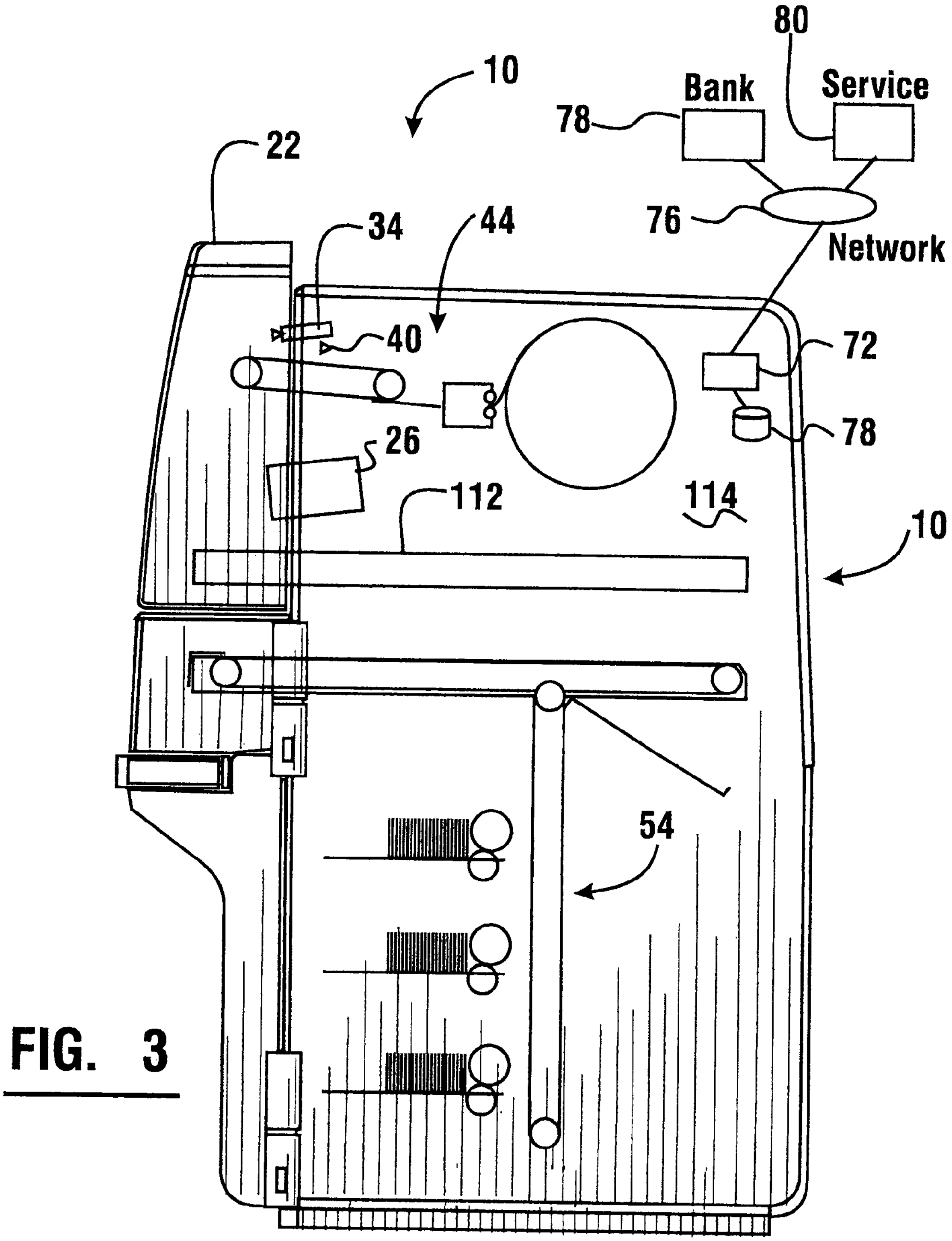
FIG. 3 is a transparent side view showing schematically some internal features of the ATM.

As schematically represented in FIG. 3, the ATM 10 includes one or more internal computers. Such internal computers include one or more processors. Such processors may be in operative connection with one or more data stores. In some embodiments processors may be located on certain devices within the ATM so as to individually control the operation thereof. Examples such as multi-tiered processor systems are shown in U.S. Pat. No. 6,264,101 and U.S. Pat. No. 6,131,809, the disclosures of which are incorporated herein by reference.

For purposes of simplicity, the exemplary embodiment will be described as having a single controller which controls the operation of devices within the machine. However it should be understood that such reference shall be construed to encompass multicontroller and multiprocessor systems as may be appropriate in controlling the operation of a particular machine. In FIG. 3 the controller is schematically represented 72. Also as schematically represented, the controller is in operative connection with one or more data stores 78. Such data stores in exemplary embodiments are operative to store program instructions, values and other information used in the operation of the machine. Although the controller is schematically shown in the upper housing portion of ATM 10, it should be understood that in alternative embodiments controllers may be located within various portions of the automated banking machine.

In order to conduct transactions the exemplary ATM 10 communicates with remote computers. The remote computers are operative to exchange messages with the machine and authorize and record the occurrence of various transactions. This is represented in FIG. 3 by the communication of the machine through a network with a bank 78, which has at least one computer which is operative to exchange messages with the ATM through a network. For example, the bank 78 may receive one or more messages from the ATM requesting authorization to allow a customer to withdraw $200 from their account. The remote computer at the bank 78 will operate to determine that such a withdrawal is authorized and will return one or more messages to the machine through the network authorizing the transaction. After the ATM conducts the transaction, the ATM will generally send one or more messages back through the network to the bank indicating that the transaction was successfully carried out. Of course these messages are merely exemplary.

It should be understood that in some embodiments the ATM may communicate with other entities and through various networks. For example as schematically represented in FIG. 3, the ATM will communicate with computers operated by service providers 80. Such service providers may be entities to be notified of status conditions or malfunctions of the ATM as well as entities who are to be notified of corrective actions. An example of such a system for accomplishing this is shown in U.S. Pat. No. 5,984,178, the disclosure of which is incorporated herein by reference. Other third parties who may receive notifications from exemplary ATMs include entities responsible for delivering currency to the machine to assure that the currency supplies are not depleted. Other entities may be responsible for removing deposit items from the machine. Alternative entities that may be notified of actions at the machine may include entities which hold marketing data concerning consumers and who provide messages which correspond to marketing messages to be presented to consumers. Various types of messages may be provided to remote systems and entities by the machine depending on the capabilities of the machines in various embodiments and the types of transactions being conducted.

Figure 4:
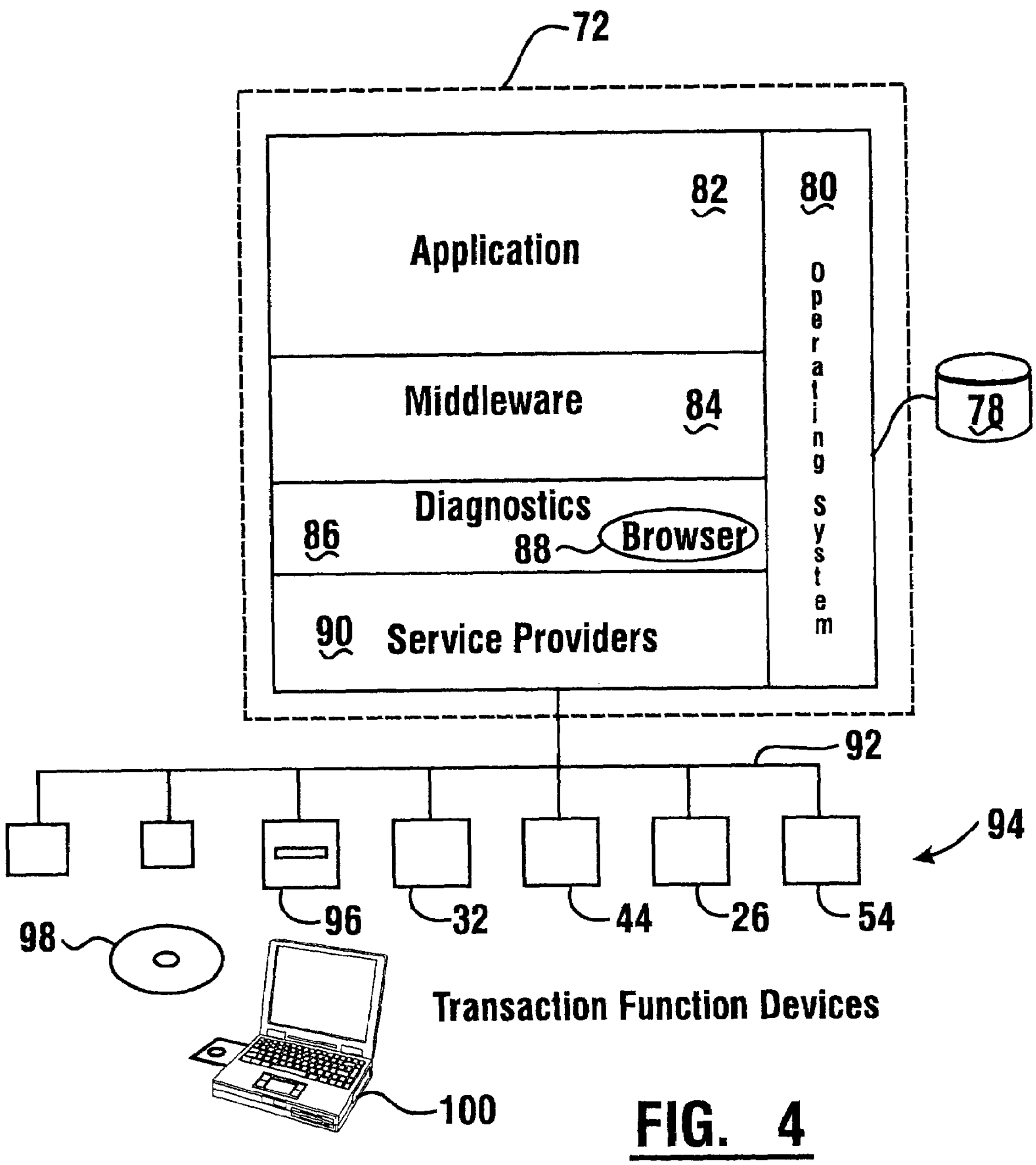
FIG. 4 is a schematic view representative of the software architecture of an exemplary embodiment.

FIG. 4 shows schematically an exemplary software architecture which may be operative in the controller 72 of machine 10. The exemplary software architecture includes an operating system such as for example Microsoft® Windows, IBM OS/2® or Linux. The exemplary software architecture also includes an ATM application 82. The exemplary application includes the instructions for the operation of the automated banking machine and may include, for example, an Agilis™ 91x application that is commercially available from Diebold, Incorporated which is a cross vendor software application for operating ATMs. A further example of a software application which may be used in some embodiments is shown in U.S. Pat. No. 6,289,320, the disclosure of which is incorporated herein by reference.

In the exemplary embodiment middleware software schematically indicated 84 is operative in the controller. In the exemplary embodiment the middleware software operates to compensate for differences between various types of automated banking machines and transaction function devices used therein. The use of a middleware layer enables the more ready use of an identical software application on various types of ATM hardware. In the exemplary embodiment the middleware layer may be Involve® software which is commercially available from Nexus Software, a wholly owned subsidiary of the assignee of the present invention.

The exemplary software architecture further includes a diagnostics layer 86. The diagnostics layer 86 is operative as later explained to enable accessing and performing various diagnostic functions of the devices within the ATM. In the exemplary embodiment the diagnostics operate in conjunction with a browser schematically indicated 88.

The exemplary software architecture further includes a service provider layer schematically indicated 90. The service provider layer may include software such as WOSA XFS service providers for J/XFS service providers which present a standardized interface to the software layers above and which facilitate the development of software which can be used in conjunction with different types of ATM hardware. Of course this software architecture is exemplary and in other embodiments other architectures may be used.

As schematically represented in FIG. 4, a controller 72 is in operative connection with at least one communications bus 92. The communications bus may in some exemplary embodiments be a universal serial bus (USB) or other standard or nonstandard type of bus architecture. The communications bus 92 is schematically shown in operative connection with transaction function devices 94. The transaction function devices include devices in the ATM which are used to carry out transactions. These may include for example the currency dispenser device 54, card reader 26, receipt printer 44, keypad 32, as well as numerous other devices which are operative in the machine and controlled by the controller to carry out transactions. In the exemplary embodiment one of the transaction function devices in operative connection with the controller is a diagnostic article reading device 96 which is later discussed in detail, and which is operative to read a diagnostic article schematically indicated 98 used in servicing the machine. As later explained, in an exemplary embodiment the diagnostic article 98 comprises a CD which can be read by reader 96 as well as computer device 100 which is not generally associated with the operation of the ATM 10.

Figure 5:
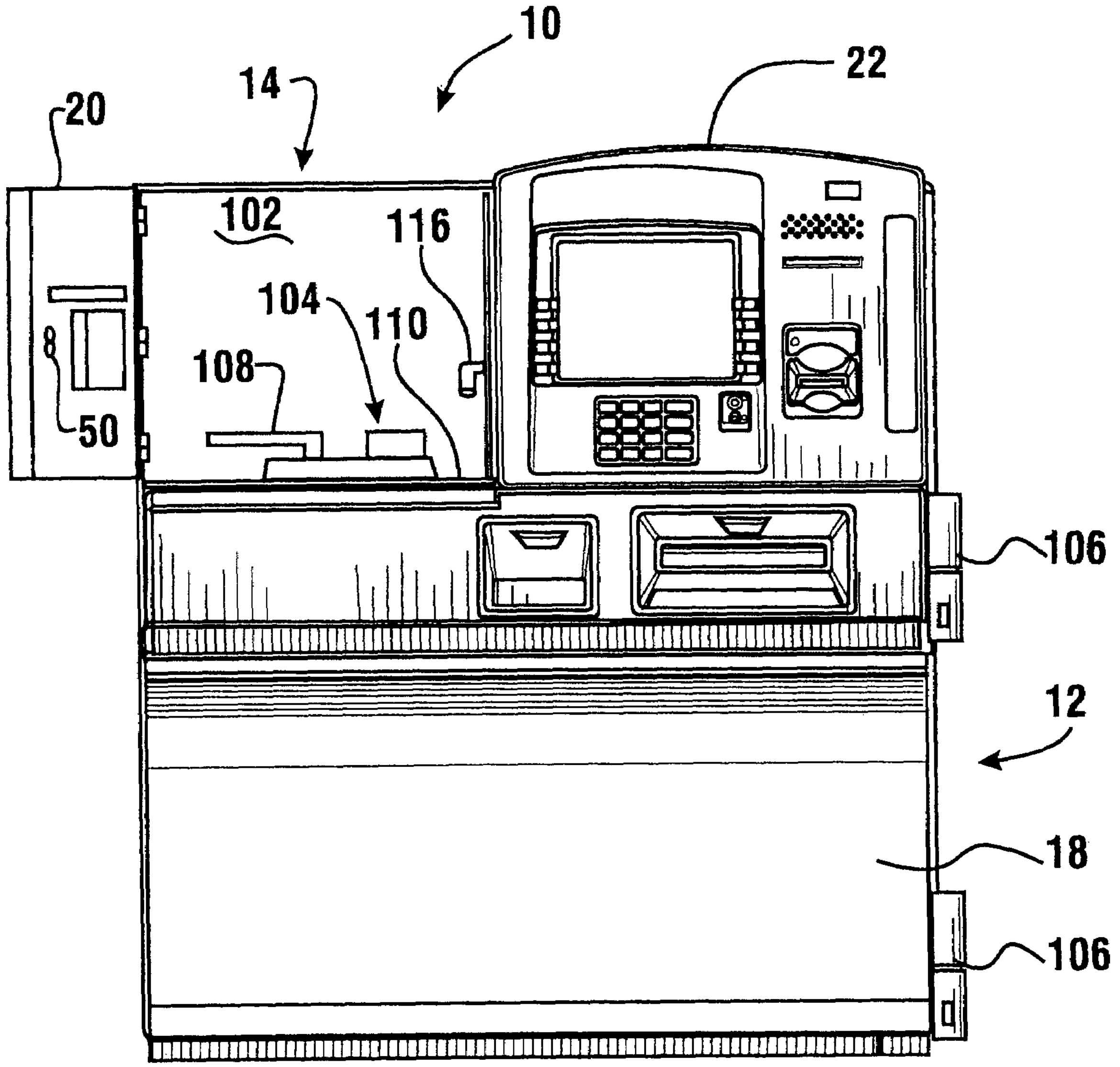
FIG. 5 is a front view showing the fascia portion moved to access a first portion of an upper housing of the machine.

In the exemplary embodiment of ATM 10 the first fascia portion 20 and the second fascia portion 22 are independently movably mounted on the ATM housing 12. This is accomplished through the use of hinges attached to fascia portion 20. The opening of the fascia lock 50 on the first fascia portion 20 enables the first fascia portion to be moved to an open position as shown in FIG. 5. In the open position of the first fascia portion an authorized user is enabled to gain access to a first portion 102 in the upper housing area 14. In the exemplary embodiment there is located within the first portion 102 a chest lock input device 104. In this embodiment the chest lock input device comprises a manual combination lock dial, electronic lock dial or other suitable input device through which a combination or other unlocking inputs or articles may be provided. In this embodiment, input of a proper combination enables the chest door 18 to be moved to an open position by rotating the door about hinges 106. In the exemplary embodiment the chest door is opened once the proper combination has been input by manipulating a locking lever 108 which is in operative connection with a boltwork. The boltwork which is not specifically shown, may be of a conventional or unconventional type that is operative to hold the chest door in a locked position until the proper combination is input. Upon input of the correct combination the locking lever enables movement of the boltwork so that the chest door can be opened. The boltwork also enables the chest door to be held locked after the activities in the chest portion have been conducted and the chest door is returned to the closed position. Of course in other embodiments other types of mechanical or electrical locking mechanisms may be used. In the exemplary embodiment the chest lock input device 104 is in supporting connection with a generally horizontally extending dividing wall 110 which separates the chest portion from the upper housing portion. Of course this housing structure is exemplary and in other embodiments other approaches may be used.

An authorized servicer who needs to gain access to an item, component or device of the ATM located in the chest area may do so by opening the fascia lock and moving the first fascia portion 20 so that the area 102 becomes accessible. Thereafter the authorized servicer may access and manipulate the chest lock input device to receive one or more inputs, which if appropriate enables unlocking of the chest door 18. The chest door may thereafter be moved relative to the housing and about its hinges 106 to enable the servicer to gain access to items, devices or components within the chest. These activities may include for example adding or removing currency, removing deposited items such as envelopes or checks, or repairing mechanisms or electrical devices that operate to enable the machine to accept deposited items or to dispense currency. When servicing activity within the chest is completed, the chest door may be closed and the locking lever 108 moved so as to secure the boltwork holding the chest door in a closed position. Of course this structure and service method is exemplary and in other embodiments other approaches may be used.

In the exemplary embodiment the second fascia portion 22 is also movable relative to the housing of the machine. In the exemplary embodiment the second fascia portion 22 is movable in supporting connection with a rollout tray 112 schematically shown in FIG. 3. The rollout tray is operative to support components of the user interface thereon as well as the second fascia portion. The rollout tray enables the second fascia portion to move outward relative to the ATM housing thereby exposing components and transaction function devices supported on the tray and providing access to a second portion 114 within the upper housing and positioned behind the second fascia portion. Thus as can be appreciated, when the second fascia portion is moved outward, the components on the tray are disposed outside the housing of the machine so as to facilitate servicing, adjustment and/or replacement of such components. Further components which remain positioned within the housing of the machine as the rollout tray is extended become accessible in the second portion as the second fascia portion 22 is disposed outward and away from the housing.

Figure 2:
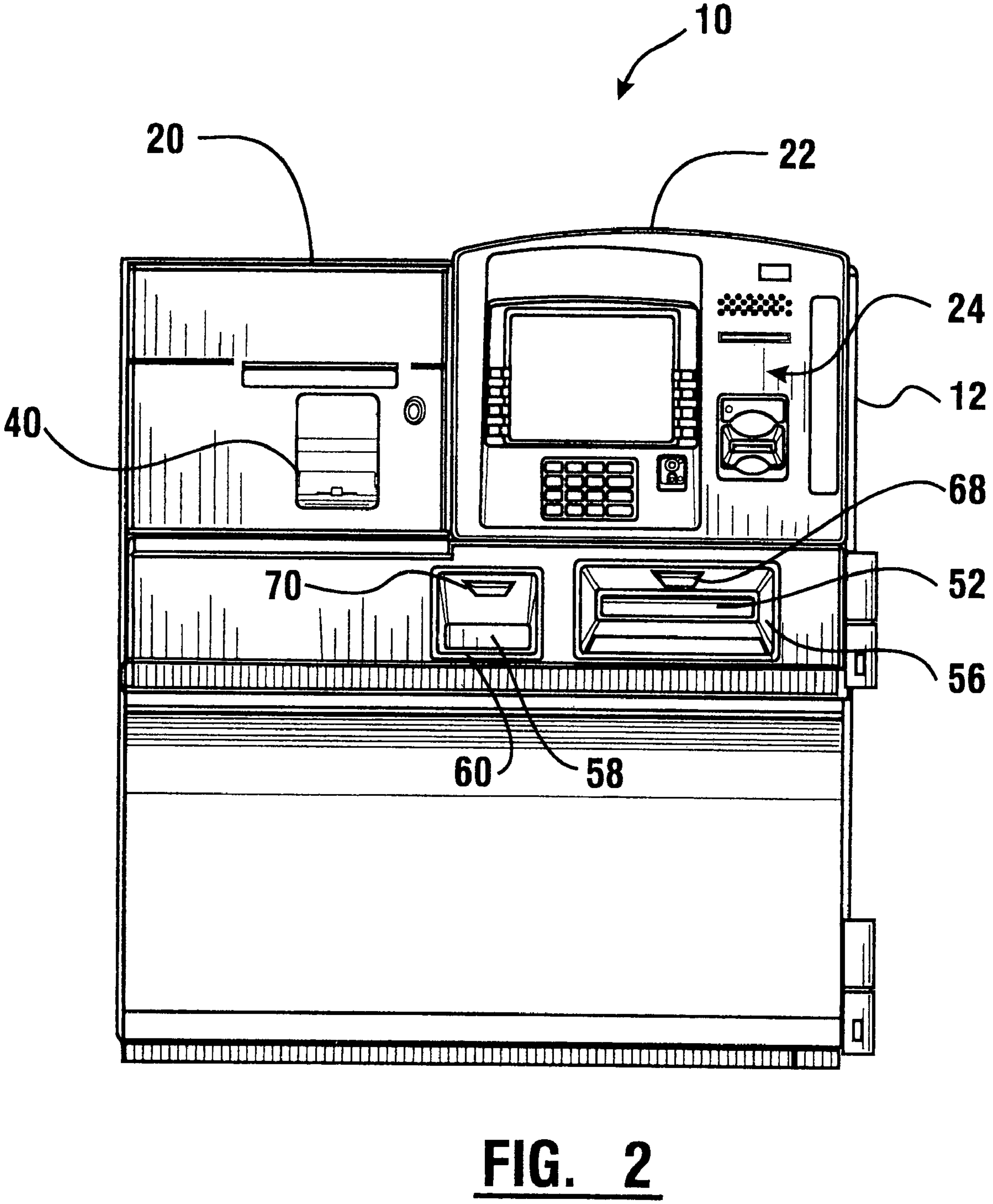
FIG. 2 is a front plan view of the ATM shown in FIG. 1.

In the exemplary embodiment the rollout tray 112 is in operative connection with a releasible locking device. The locking device is generally operative to hold the tray in a retracted position such that the second fascia portion remains in an operative position adjacent to the upper housing area as shown in FIGS. 1, 2 and 3. This releasible locking mechanism may comprise one or more forms of locking type devices. In the exemplary embodiment the releasible locking mechanism may be released by manipulation of an actuator 116 which is accessible to an authorized user in the first portion 102 of the upper housing 14. As a result an authorized servicer of the machine is enabled to move the second fascia portion outward for servicing by first accessing portion 102 in the manner previously discussed. Thereafter by manipulating the actuator 116 the second fascia portion is enabled to move outward as shown in phantom in FIG. 11 so as to facilitate servicing components on the rollout tray. Such components may include for example a printer or card reader. After such servicing the second fascia portion may be moved toward the housing so as to close the second portion 114. Such movement in the exemplary embodiment causes the rollout tray to be latched and held in the retracted position without further manipulation of the actuator. However, in other embodiments other types of locking mechanisms may be used to secure the rollout tray in the retracted position. It should be understood that this approach is exemplary and in other embodiments other approaches may be used.

Figure 6:
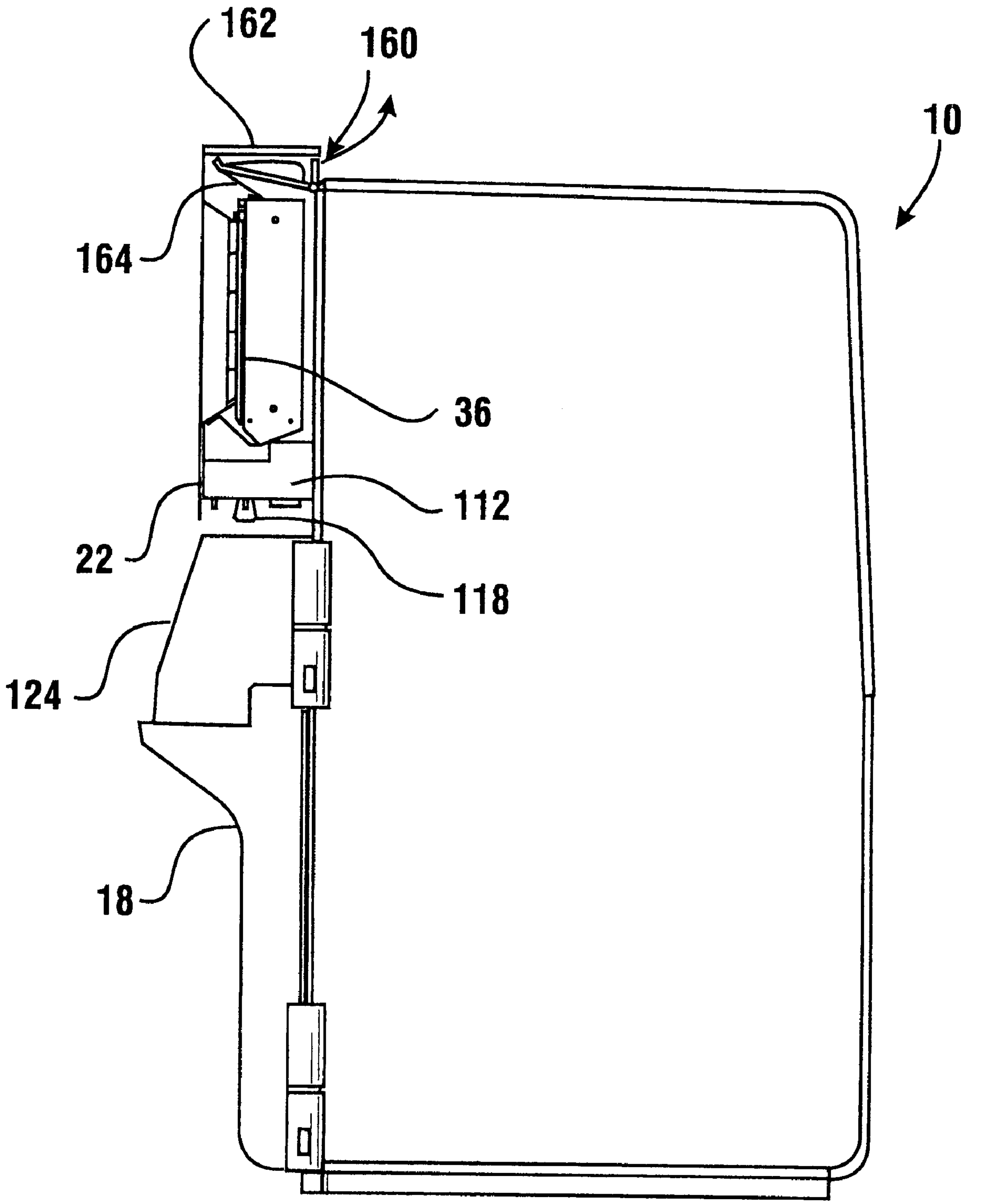
FIG. 6 is a partially transparent side view showing air flow through an air cooling opening of the machine.
Figure 10:
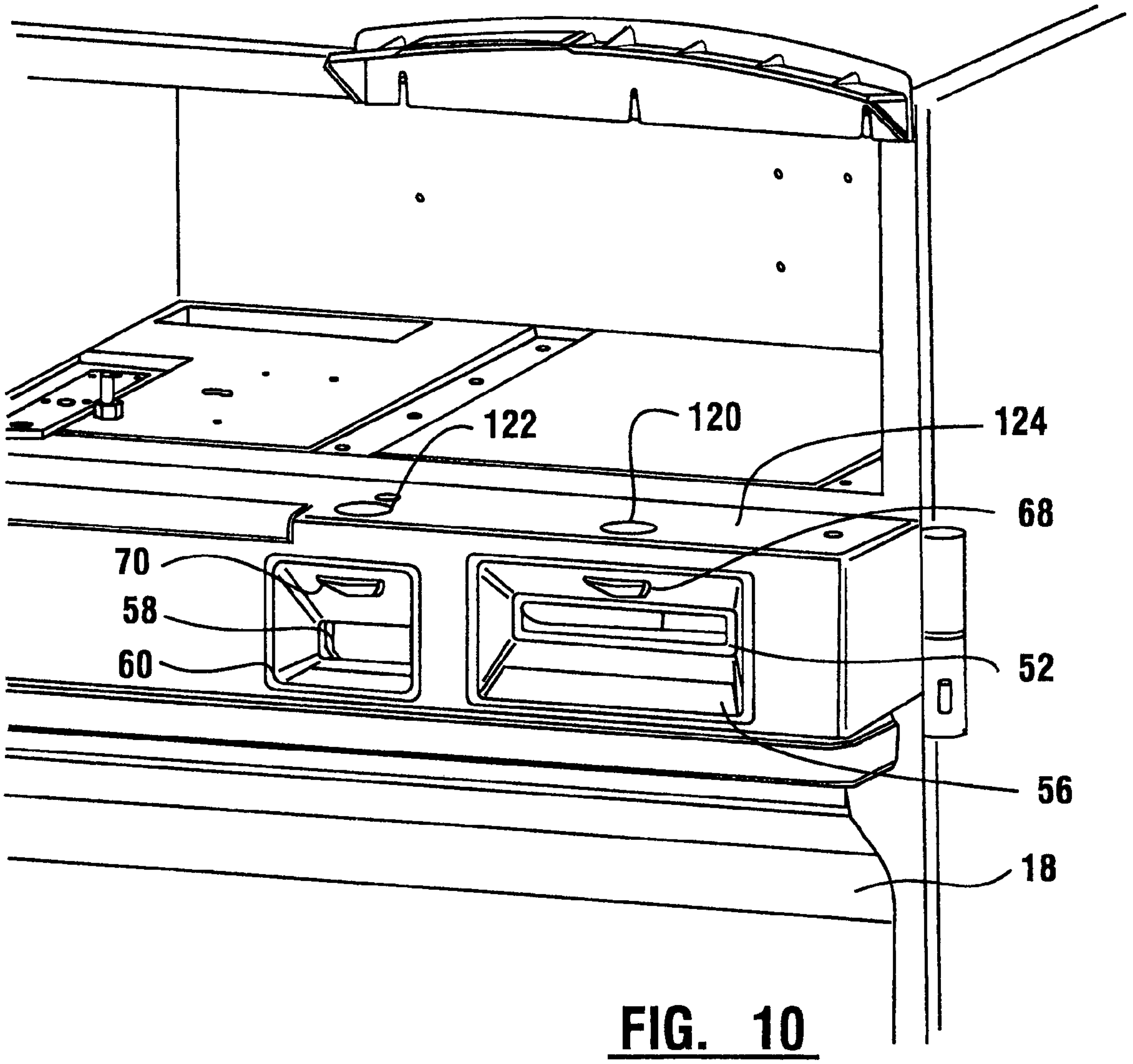
FIG. 10 is an isometric view of the ATM shown in FIG. 1 with the components of the upper housing portion removed and showing aspects of the illumination system for the transaction areas supported on the chest portion of the housing.

As best shown in FIG. 10 in which the components supported in the upper housing are not shown, the delivery area 52 and the deposit acceptance area 58 are in supporting connection with the chest door 18. As such when the chest door 18 is opened, the delivery area 52 and the deposit acceptance area 58 will move relative to the housing of the machine. The exemplary embodiment shown facilitates servicing of the machine by providing for the illumination for the transaction areas by illumination sources positioned in supporting connection with the rollout tray 112. As best shown in FIG. 6, these illumination sources 118 are movable with the rollout tray and illuminate in generally a downward direction. In the operative position of the second fascia portion 22 and the chest door 18, the illumination sources are generally aligned with apertures 120 and 122 which extend through the top of a cover 124 which generally surrounds the recessed pockets 60 and 56. As shown in FIG. 10 aperture 120 is generally vertically aligned with window 68 and aperture 122 is generally aligned with window 70. In an exemplary embodiment apertures 120 and 122 each have a translucent or transparent lens positioned therein to minimize the risk of the introduction of dirt or other contaminants into the interior of the cover 124.

Figure 11:
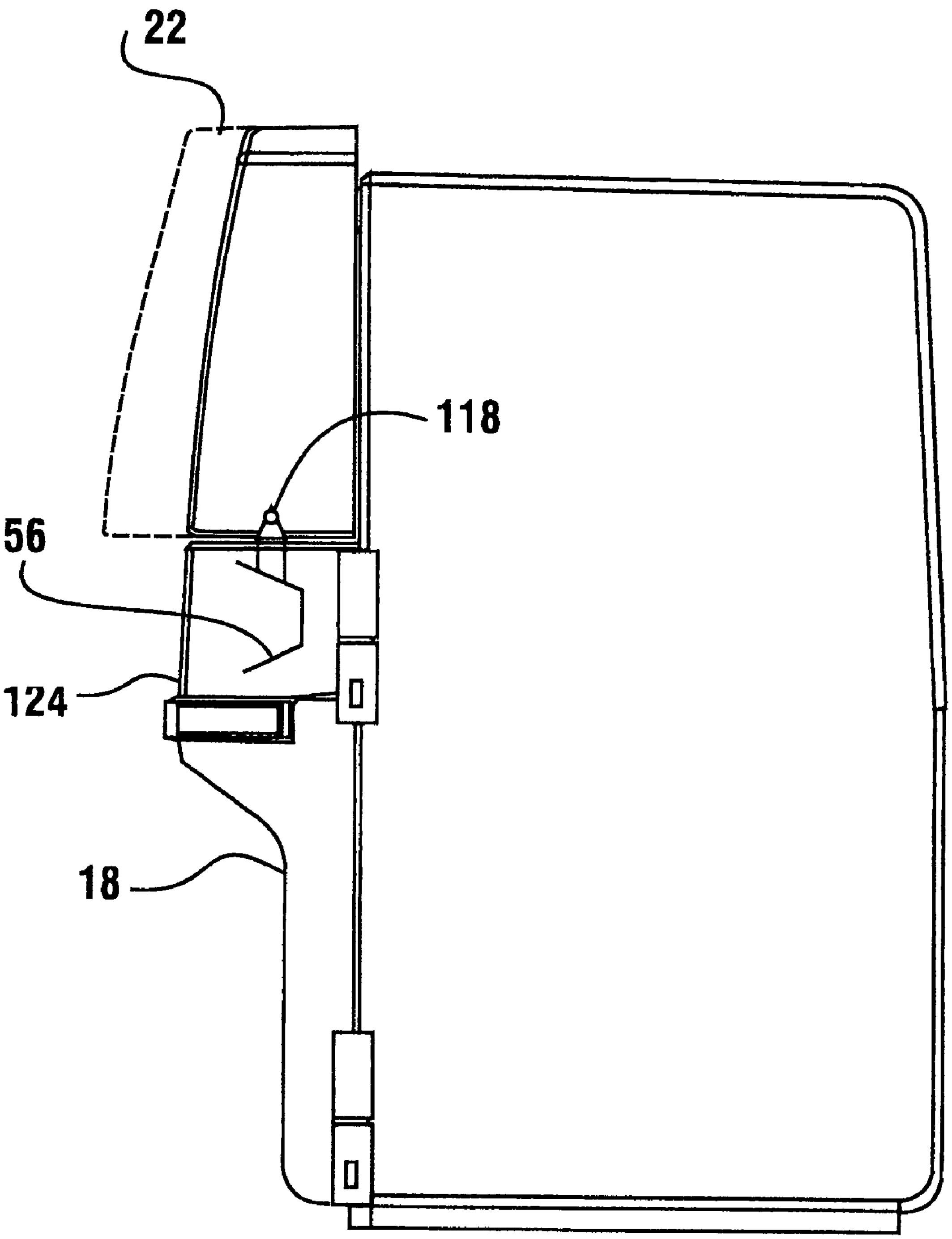
FIG. 11 is a schematic side view of the housing showing schematically the illumination system for the transaction areas and representing in phantom the movement of the upper fascia portion so as to provide access for servicing.

As can be appreciated from FIGS. 6 and 11, when the chest door 18 is closed and the second fascia portion 22 is moved to the operative position, the illumination sources 118 are positioned in generally aligned relation with apertures 120 and 122. As a result the illumination of the illumination devices is operative to cause light to be transmitted through the respective aperture and to illuminate the transaction area within the corresponding recessed pocket.

In operation of an exemplary embodiment, the controller executes programmed instructions so as to initiate illumination of each transaction area at appropriate times during the conduct of transactions. For example in the exemplary embodiment if the user is conducting a cash withdrawal transaction, the controller may initiate illumination of the delivery area 52 when the cash is delivered therein and is available to be taken by a user. Such illumination draws the user's attention to the need to remove their cash and will point out to the user that the cash is ready to be taken. In the exemplary embodiment the controller is programmed so that when the user takes their cash the machine will move to the next transaction step. After the cash is sensed as taken, the controller may operate to cease illumination of the delivery area 56.

Likewise in an exemplary embodiment if a user of the machine indicates that they wish to conduct a deposit transaction, the controller may cause the machine to operate to initiate illumination of the deposit acceptance area 58. The user's attention is drawn to the place where they must insert the deposit envelope in order to have it be accepted in the machine. In the exemplary embodiment the controller may operate to also illuminate the illumination panel 62 to illuminate the deposit envelope providing opening 48 so that the user is also made aware of the location from which a deposit envelope may be provided. In an exemplary embodiment the controller may operate to cease illumination through the window 70 and/or the illumination panel 62 after the deposit envelope is indicated as being sensed within the machine.

In alternative embodiments other approaches may be taken. This may include for example drawing the customer's attention to the particular transaction area by changing the nature of the illumination in the recessed pocket to which the customer's attention is to be drawn. This may be done for example by changing the intensity of the light, flashing the light, changing the color of the light or doing other actions which may draw a user's attention to the appropriate transaction area. Alternatively or in addition, a sound emitter, vibration, projecting PIN or other indicator may be provided for visually impaired users so as to indicate to them the appropriate transaction area to which the customer's attention is to be drawn. Of course these approaches are exemplary and in other embodiments other approaches may be used.

As can be appreciated the exemplary embodiment enables one or more illumination devices which are movable relatively with respect to the area to be illuminated to be used without the need for additional moving wiring harnesses or other releasible connectors. In addition the exemplary location of the illumination device 118, extending on the underside of the rollout tray 112 facilitates changing the illumination device by extending the rollout tray in the manner previously discussed and as is shown in FIG. 11. Of course it should be understood that the principles described can be applied to numerous types of banking machine structures and configurations which may be encompassed by the claims presented herein.

Figure 14:
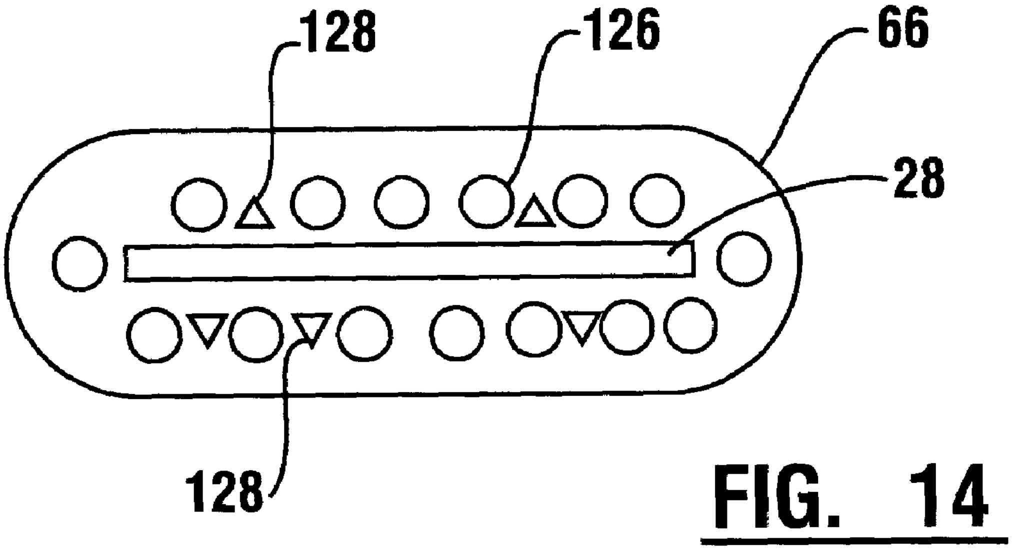
FIG. 14 is a schematic view of an illumination and anti-fraud sensing device which bounds a card reader slot of an exemplary embodiment.

As previously discussed the exemplary embodiment of ATM 10 is also operative to draw a user's attention at appropriate times to the card reader slot 28. ATM 10 also includes features to minimize the risk of unauthorized interception of card data by persons who may attempt to install a fraud device such as an unauthorized card reading device on the machine. As shown in FIG. 14, the exemplary card slot 28 extends through a card slot housing 66 which extends in generally surrounding relation of the card slot. It should be understood that although the housing 66 generally bounds the entire card slot, in other embodiments the principles described herein may be applied by bounding only one or more sides of a card slot as may be appropriate for detecting unauthorized card reading devices. Further, it should be understood that while the exemplary embodiment is described in connection with a card reader that accepts a card into the machine, the principles being described may be applied to types of card readers that do not accept a card into the machine, such as readers where a user draws the card through a slot, inserts and removes a card manually from a slot and other card reading structures.

In the exemplary embodiment the housing 66 includes a plurality of radiation emitting devices 126. The radiation emitting devices emit visible radiation which can be perceived by a user of the machine. However, in other embodiments the radiation emitting devices may include devices which emit nonvisible radiation such as infrared radiation, but which nonetheless can be used for sensing the presence of unauthorized card reading devices adjacent to the card slot. In the exemplary embodiment the controller operates to illuminate the radiation emitting devices 126 at appropriate times during the transaction sequence. This may include for example times during transactions when a user is prompted to input their card into the machine or alternatively when a user is prompted to take their card from the card slot 28. In various embodiments the controller may be programmed to provide solid illumination of the radiation emitting devices or may vary the intensity of the devices as appropriate to draw the user's attention to the card slot.

In the exemplary embodiment the card slot housing 66 includes therein one or more radiation sensing devices 128. The radiation sensing devices are positioned to detect changes in at least one property of the radiation reflected from the emitting devices 126. The sensing devices 128 are in operative connection with the controller. The controller is operative responsive to its programming to compare one or more values corresponding to the magnitude and/or other properties of radiation sensed by one or more of the sensors, to one or more stored values and to make a determination whether the comparison is such that there is a probable unauthorized card reading device installed on the fascia of the machine. In some embodiments the controller may be operative to execute fuzzy logic programming for purposes of determining whether the nature of the change in reflected radiation is such that there has been an unauthorized device installed and whether appropriate personnel should be notified.

Figure 15:
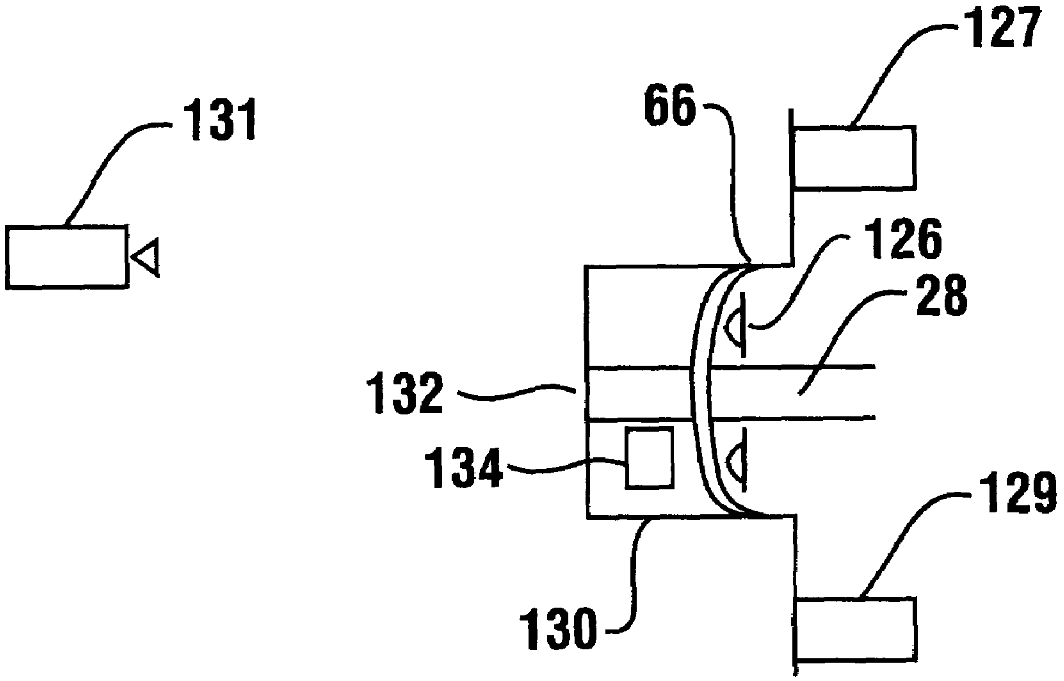
FIG. 15 is a schematic side view of an unauthorized card reading device in operative connection with a housing of the anti-fraud sensor.

FIG. 15 shows a side view of the housing 66. An example of a fraud device which comprises unauthorized card reading device 130 is shown attached externally to the housing 66. The unauthorized card reading device includes a slot 32 generally aligned with slot 128. The device 130 also includes a sensor shown schematically as 134 which is operative to sense the encoded magnetic flux reversals which represent data on the magnetic stripe of a credit or debit card. As can be appreciated, an arrangement of the type shown in FIG. 15 enables the sensor 134 if properly aligned adjacent to the magnetic stripe of a card, to read the card data as the card passes in and out of slot 28. Such an unauthorized reading device may be connected via RF or through inconspicuous wiring to other devices which enable interception of the card data. In some situations criminals may also endeavor to observe the input of the user's PIN number corresponding to the card data so as to gain access to the account of the user.

As can be appreciated from FIG. 15 the installation of the unauthorized card reading device 130 changes the amount of radiation from emitting devices 126 and that is reflected or otherwise transmitted to the sensors 128. Depending on the nature of the device and its structure, the amount or other properties of radiation may increase or decrease. However, a detectable change will often occur in the magnitude or other properties of sensed radiation between a present transaction and a prior transaction which was conducted prior to an unauthorized card reading device being installed. Of course the sensing of the magnitude of radiation is but one example of a property of radiation that may be sensed as having changed so as to indicate the presence of an unauthorized reading device.

Figure 16:
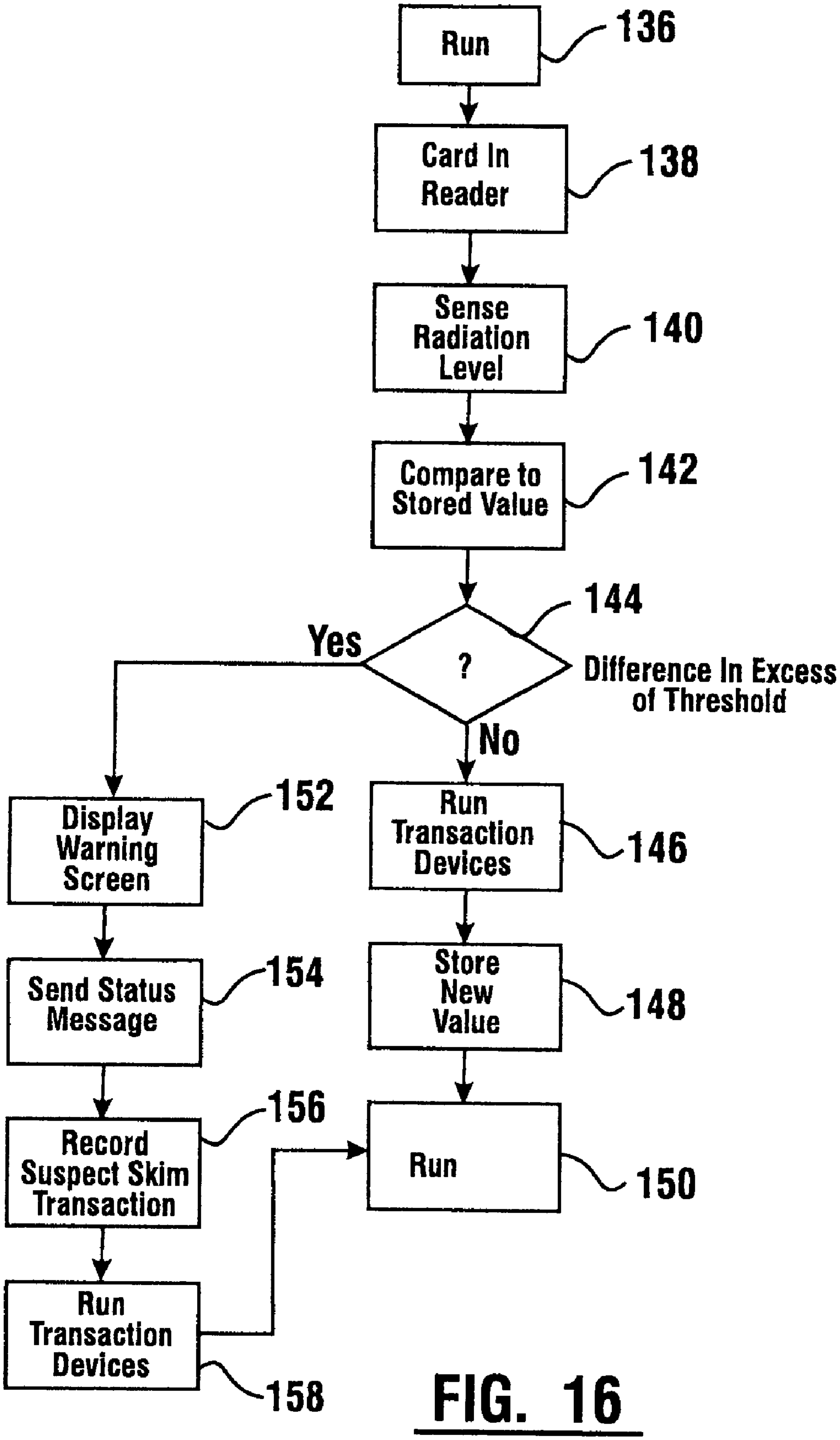
FIG. 16 is a schematic view of exemplary logic for purposes of detecting the presence of an unauthorized card reading device in proximity to the card reader during operation of the ATM.

FIG. 16 demonstrates an exemplary simplified logic flow executed by a controller for detecting the installation of an unauthorized card reading device. It should be understood that this transaction logic is part of the overall operation of the machine to carry out transactions. In this exemplary logic flow the machine operates to carry out card reading transactions in a normal manner and to additionally execute the represented steps as a part of such logic each time a card is read. From an initial step 136 the controller in the machine is operative to sense that a card is in the reader within the machine in a step 138. Generally in these circumstances the controller will be operating the radiation emitting devices 126 as the user has inserted their card and the card has been drawn into the machine. In this exemplary embodiment the controller continues to operate the radiation emitting devices and senses the radiation level or levels sensed by one or more sensors 128. This is done in a step 140.

The controller is next operative to compare the signals corresponding to the sensed radiation levels to one or more values in a step 142. This comparison may be done a number of ways and may in some embodiments employ fuzzy logic so as to avoid giving false indications due to acceptable conditions such as a user having their finger adjacent to the card slot 28 during a portion of the transaction. In the case of a user's finger for example, the computer may determine whether an unauthorized reading device is installed based on the nature, magnitude and changes during a transaction in sensed radiation, along with appropriate programmed weighing factors. Of course various approaches may be used within the scope of the concept discussed herein. However, based on the one or more comparisons in step 142 the controller is operative to make a decision at step 144 as to whether the sensed value(s) compared to stored value(s) compared in step 142 have a difference that is in excess of one or more thresholds which suggest that an unauthorized card reading device has been installed.

If the comparison does not indicate a result that exceeds the threshold(s) the ATM transaction devices are run as normal as represented in a step 146. Further in the exemplary embodiment, the controller may operate to adjust the stored values to some degree based on the more recent readings. This may be appropriate in order to compensate for the effects of dirt on the fascia or loss of intensity of the emitting devices or other factors. This is represented in a step 148. In step 148 the controller operates the ATM to conduct transaction steps in the usual manner as represented in a step 150.

If in step 144 the difference between the sensed and stored values exceeds the threshold(s), then this is indicative that an unauthorized card reading device may have been installed since the last transaction. In the exemplary embodiment when this occurs, the controller is operative to present a warning screen to the user as represented in a step 152. This warning screen may be operative to advise the user that an unauthorized object has been sensed adjacent to the card reader slot. This may warn a user for example that a problem is occurring. Alternatively if a user has inadvertently placed innocently some object adjacent to the card reader slot, then the user may withdraw it. In addition or in the alternative, further logic steps may be executed such as prompting a user to indicate whether or not they can see the radiation emitting devices being illuminated adjacent to the card slot and prompting the user to provide an input to indicate if such items are visible. Additionally or in the alternative, the illuminating devices within the housing 66 may be operative to cause the emitting devices to output words or other symbols which a user can indicate that they can see or cannot see based on inputs provided as prompts from output devices of the machine. This may enable the machine to determine whether an unauthorized reading device has been installed or whether the sensed condition is due to other factors. It may also cause a user to note the existence of the reading device and remove it. Of course various approaches could be taken depending on the programming of the machine.

If an unauthorized reading device has been detected, the controller in the exemplary embodiment will also execute a step 154 in which a status message is sent to an appropriate service provider or other entity to indicate the suspected problem. This may be done for example through use of a system like that shown in U.S. Pat. No. 5,984,178 the disclosure of which is incorporated herein by reference. Alternatively messages may be sent to system addresses in a manner like that shown in U.S. Pat. No. 6,289,320 the disclosure of which is also incorporated herein by reference. In a step 156 the controller will also operate to record data identifying for the particular transaction in which there has been suspected interception of the card holder's card data. In addition or in the alternative, a message may be sent to the bank or other institution alerting them to watch for activity in the user's card account for purposes of detecting whether unauthorized use is occurring. Alternatively or in addition, some embodiments may include card readers that change, add or write data to a user's card in cases of suspected interception. Such changed data may be tracked or otherwise used to assure that only a card with the modified data is useable thereafter. Alternatively or in addition, in some embodiments the modified card may be moved in translated relation, moved irregularly or otherwise handled to reduce the risk that modified data is intercepted as the card is output from the machine. Of course these approaches are exemplary of many that may be employed.

In the exemplary embodiment the ATM is operated to conduct a transaction even in cases where it is suspected that an unauthorized card reading device has been installed. This is represented in a step 158. However, in other embodiments other approaches may be taken such as refusing to conduct the transaction. Other steps may also be taken such as capturing the user's card and advising the user that a new one will be issued. This approach may be used to minimize the risk that unauthorized transactions will be conducted with the card data as the card can be promptly invalidated. Of course other approaches may be taken depending on the programming of the machine and the desires of the system operator. In addition while the fraud device shown is an unauthorized card reading device, the principles described may also be used to detect other types of fraud devices such as for example false fascias, user interface covers and other devices.

In some embodiments additional or alternative features and methods may be employed to help detect the presence of unauthorized card reading devices or other attempted fraud devices in connection with the ATM. For example in some embodiments an oscillation sensor may be attached to the machine to detect changes in frequency or vibration that result from the installation of unauthorized devices on the ATM. FIG. 15 shows schematically an oscillator 127 attached to the interior surface of the ATM fascia. Oscillator 127 may be operative responsive to the controller and suitable vibration circuitry to impart vibratory motion to the fascia in the vicinity of the card reader slot. A sensor 129 is in operative connection with the fascia and is operative to sense at least one parameter of the motion imparted to the fascia by the oscillator 127. Although oscillator 127 and sensor 129 are shown as separate components, it should be understood that in some embodiments the functions of the components may be performed by a single device.

The sensor 129 is in operative connection with the controller of the ATM through appropriate circuitry. The controller selectively activates the oscillator and the sensor 129 is operative to sense the resulting movement of the fascia caused by the oscillation. The installation of an unauthorized card reading device or other fraud device on the ATM will generally result in a change in at lest one property being sensed by the sensor 129. This may include changes in amplitude, frequency or both. Alternatively or in addition, some embodiments may provide for the oscillator to impart vibration characteristics of various types or vibratory motion through a range of frequencies and/or amplitudes. Sensed values for various oscillatory driving outputs may then be compared through operation of the controller to one or more previously stored values. Variances from prior values may be detected or analyzed through operation of the controller and notifications given in situations where a change has occurred which suggests the installation of an unauthorized device.

In some embodiments the controller may cause the oscillator and sensor to operate periodically to sense for installation of a possible unauthorized device. Alternatively, the controller may cause such a check to be made during each transaction. Alternatively in some embodiments oscillation testing may be conducted when a possible unauthorized device is detected by sensing radiation properties. The controller may operate to take various actions in response to sensing a possible unauthorized reading device through vibration, radiation or both. For example detecting a possible fraud device by both radiation and oscillation may warrant taking different actions than only detecting a possible fraud device through only one test or condition.

In some embodiments the controller may be programmed to adjust the thresholds or other limits used for resolving the presence of a possible fraud device for responses to changes that occur over time at the machine. This may include for example adjusting the thresholds for indicating possible fraud conditions based on the aging of the oscillator or the sensor. Such adjustments may also be based on parameters sensed by other sensors which effect vibration properties. These may include for example, the fascia temperature, air temperature, relative humidity and other properties. Of course readings from these and other sensors may be used to adjust thresholds of the oscillation sensor, radiation sensor or other fraud device sensors. Various approaches may be taken depending on the particular system.

In some embodiments the oscillator may additionally or alternatively be used to prevent the unauthorized reading of card reader signals. This may be done for example when the banking machine has a device which takes a user card into the machine for purposes of reading data on the card. In such embodiments the controller may operate to vibrate the area of the fascia adjacent to the card reader slot when a user's card is moving into and/or out of the slot. In such cases the vibration may be operative to cause the generation of noise or inaccurate reading by an unauthorized card reading sensor so as to make it more difficult to intercept the card stripe data using an unauthorized reading device. In some embodiments such vibration may also serve to disclose or make more apparent the presence of unauthorized card reading devices. Of course these approaches are exemplary and in other embodiments other approaches may be used.

In other embodiments other or additional approaches to detecting fraudulent reading or other improper activities may be used. For example, in some embodiments the fascia of the banking machine may be subject to observation within a field of view of one or more imaging devices such as camera 131 schematically represented in FIG. 15. Camera 15 may be in operative connection with an image capture system of the type shown in allowed U.S. patent application Ser. No. 09/414,249 filed Oct. 7, 1999 the disclosure of which is incorporated herein by reference.

In some embodiments the ATM controller or a connected system may be operative to capture images of the fascia of the ATM or portions thereof. The system may be programmed to compare the fascia or selected portions thereof with image data previously captured. If a sufficient difference in the image data is sensed relative to prior image data, the controller or a connected server may be operative to send a message and/or provide image data to a remote observer through a network to enable observation of an unauthorized device on the ATM fascia. For example, in some embodiments the system may be operative to compare image data related for the fascia when the banking machine is not being conducted by a user. The system may be operative to compare image data for the fascia or selected portions thereof and execute a sequence of actions responsive to differences in image data. The sequence may include for example moving image data in temporary storage in connection with the image capture system to more permanent storage, giving notifications to remote systems addresses, having the controller conduct other tests to determine if an unauthorized card reading device has been installed, such as sensing radiation or oscillation. Alternatively operation of the banking machine may be suspended pending investigation. Of course, these approaches are merely exemplary.

In the alternative or in addition, the controller or one or more computers associated with the image capture system may include software for capturing and comparing topographical features and relationships of the ATM fascia. Such a system may operate to initially capture such features of the ATM fascia, and thereafter compare the sensed features to the original topographical features. This may be accomplished in a manner comparable to that used for human facial recognition or other comparisons of biometric features. Upon sensing a change in the data the controller may be operating to take programmed steps of the type previously discussed.

In some embodiments the controller and/or image capture system may be operative to execute sequences of activities responsive to triggering events that may be associated with attempts to install or operate fraud devices. For example, the presence of a person in front of the banking machine may be sensed through image analysis, weight sensors, sonic detectors or other detectors. The person remaining in proximity to the machine for a selected period or remaining too long after a transaction may constitute a triggering event which is operative to cause the system to take actions in a programmed sequence. Such actions may include capturing images from one or more additional cameras and/or moving image data from one or more cameras from temporary to more permanent storage. The sequence may also include conducting an analysis of all or portions of image data from the fascia to try to detect tampering or improper devices. Radiation or vibration tests may also be conducted as part of a sequence. Notifications and/or images may also be sent to certain entities or system addresses. Of course these actions are exemplary.

Alternatively or in addition, triggering events associated with sequences may include sensed ATM conditions or malfunctions that may be associated with tampering or the installation of fraud devices. For example, sensing an object at an entry slot to a card reader, or placing an object to open a shutter at the entrance of a card reader slot, without a card being read within a defined time thereafter may be indicative of an attempt to install an unauthorized reading device. Such sensed conditions may serve as a triggering event for executing a sequence. Also, if the ATM experiences what appears to be a card read failure, or two consecutive failures, this could be an indication that an unauthorized card read device has been installed and may serve as a triggering event for execution of a sequence.

Alternatively or in addition, if the banking machine senses inputs to the keypad and/or function keys at times not corresponding to an appropriate time for such inputs during a transaction, this may be an indication that a fraud device has or is being installed. An indication by the ATM that cash was presented to a user but not taken may also be an indication that a fraud device is installed or ATM tampering has occurred. Situations where receipts are frequently presented to the machine user but not sensed as taken may also indicate the presence of a fraud device. Such events may serve as triggering events for executing a sequence that results in further analysis for detection of fraud devices, the capture of images, the sending of messages, taking the banking machine out of service or the initiation of other actions which are part of a programmed sequence.

In some exemplary embodiments the controller of the ATM or other connected computers may be operatively programmed to analyze conditions that are sensed and to determine based on the sensed conditions that a found device is installed. Such a programmed controller may be operative to apply certain rules such as to correlate the repeated sensing of abnormal conditions with a possible fraud or tampering condition and to conduct tests for the presence of fraud devices. Such events may constitute soft triggers for sequences or other actions to detect and reduce the risk of fraud devices. Of course these approaches are merely exemplary and in other embodiments other approaches may be used.

The exemplary embodiment of the ATM 10 is a machine that is generally constructed for outdoor use and operation. As such it may be subjected to extremes of temperatures. However, the components of the ATM such as the controller, currency dispenser, display and other items may be sensitive to temperature and may begin to malfunction if the temperature within the housing of the machine becomes too hot or too cold.

In the exemplary embodiment the display 36 comprises a high illumination flat panel type display. Some types of such displays generate considerable heat which if not properly dissipated can cause high temperatures and damage components of the machine. In the exemplary embodiment the risk of such damage is reduced by providing air flow cooling through the housing of the machine, and specifically by providing air flow inside the housing within the area adjacent the display 36.

As shown in FIG. 6, the exemplary embodiment of ATM 10 includes an air cooling opening 160. In the exemplary embodiment the air cooling opening 160 extends between the top wall 162 of the second fascia portion 22 and a baffle structure 164 which is fixedly attached to the housing of the machine. As further explained in detail hereafter, the baffle structure 164 is operative to enable cooling air flow to pass through the housing around the rear and sides of the display 36 and to pass out of the housing through the opening 160. However, the exemplary baffle structure is operative to minimize the risk of infiltration of moisture such as liquid water, droplets, snow, condensation and other contaminants into the interior area of the housing. Further, the exemplary baffle structure is adapted to direct contaminants to the outside of the housing so as to avoid the accumulation thereof on the baffle.

Figure 7:
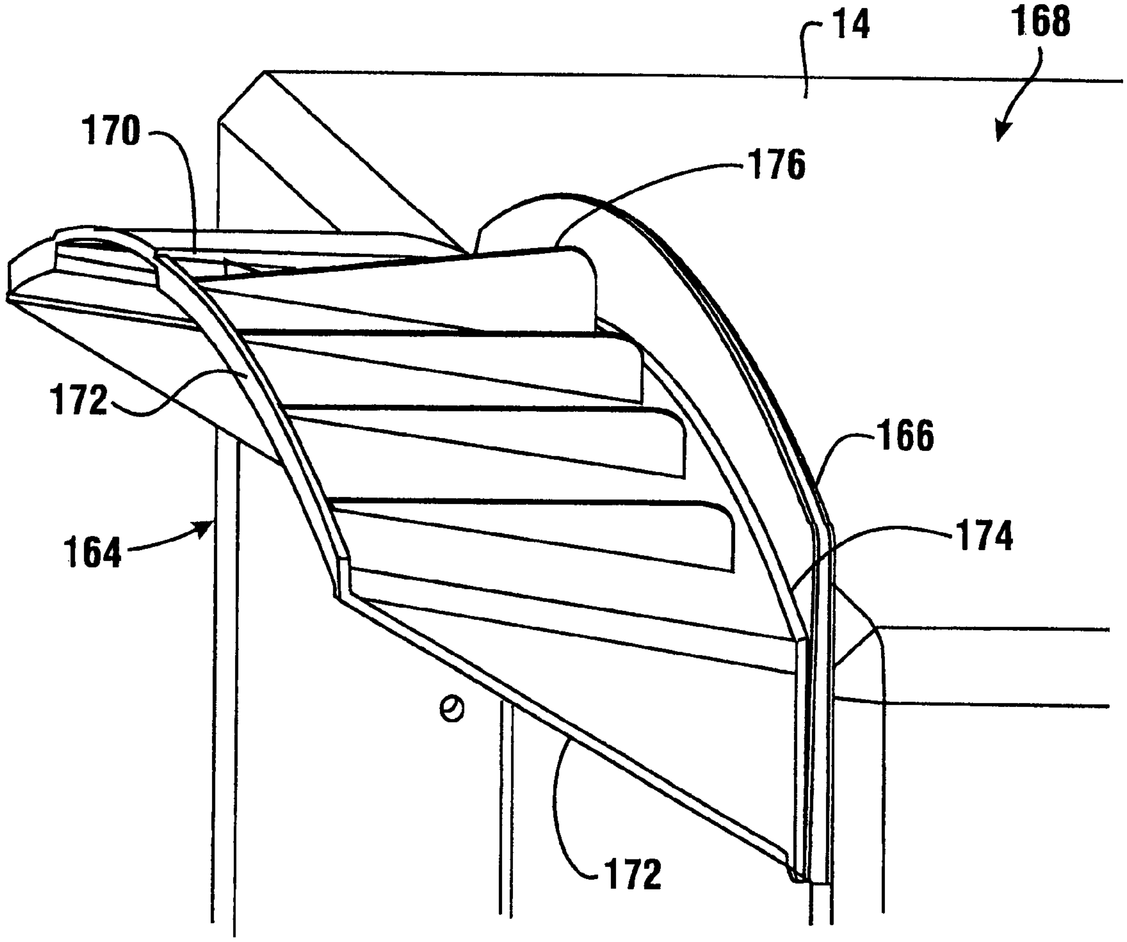
FIG. 7 is an isometric view showing a baffle structure used in an exemplary embodiment.

The exemplary baffle structure 164 is shown in greater detail in FIG. 7. The exemplary baffle structure includes a vertically extending wall portion 166 that extends upward adjacent to the machine housing. As shown in FIG. 7 in the exemplary baffle structure, the vertically extending wall portion 166 extends above the generally flat top surface 168 of the housing. The exemplary baffle 164 further includes an arcuate surface 170. The arcuate surface 170 extends generally forward of the wall portion 166. In the operative position of the rollout tray 112 represented in FIG. 6, the arcuate surface 170 overlies the display 36 in a generally shroud like fashion.

In the exemplary embodiment the arcuate surface 170 has at the forward and side peripheries thereof, a lip 172. The lip 172 is operative to catch and direct moisture and other contaminants that may collect on the baffle toward the area of the baffle adjacent to the wall 166. Further as shown in FIG. 7, the arcuate surface 170 is generally angled to direct moisture toward the wall surface.

Positioned adjacent to the wall surface 166 is a moisture collecting trough 174. The moisture collecting trough is operative to capture moisture and other contaminants that move toward the wall and to direct them to the side of the arcuate surface and to the exterior of the housing in a manner that is later discussed. In the exemplary embodiment of the baffle structure 164, there are a plurality of fin portions 176 that extend generally outward from the arcuate surface 170. The fin portions 176 are generally disposed forward away from the wall 166 so as to avoid interfering with the flow of material through the moisture collecting trough 174. As can be appreciated the fin portions are operative to direct air flow which passes across the baffle as well as to minimize the potential cross flow of moisture across the arcuate surface except in the area of the moisture collecting trough.

Figure 8:
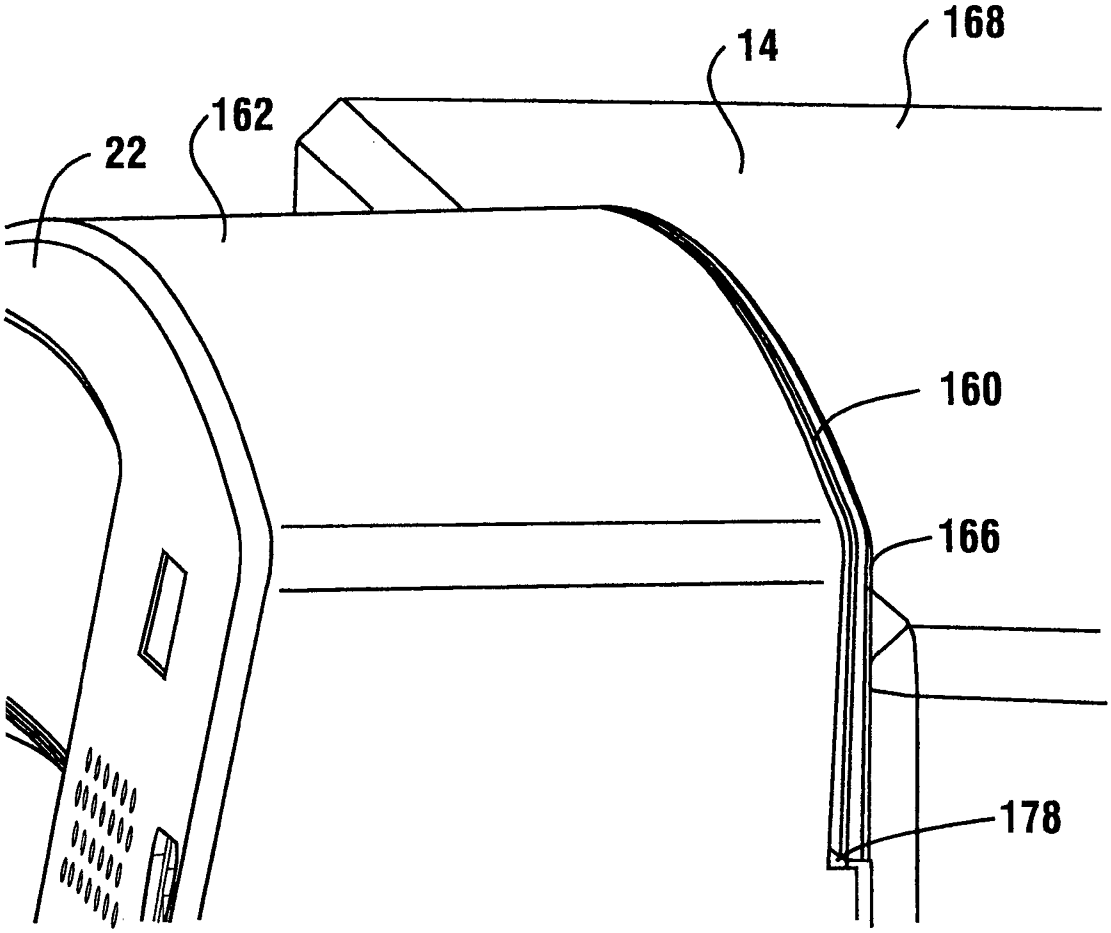
FIG. 8 is an isometric view showing a fascia portion in an operative position adjacent the baffle.

As shown in FIG. 8 when the second fascia portion 122 is moved to the operative position, the air cooling opening 150 extends generally between the top wall 162 of the second fascia portion and the forward face of the vertically extending wall portion 166. This elongated opening provides sufficient area for air flow as required for maintaining the interior of the housing within the desired temperature range. Further, the configuration of the fascia portion 22 and the baffle structure 164 in the operative position causes the moisture collecting trough to direct moisture and contaminants collected therein to the outside of the ATM housing through a base area 178 of the air cooling opening. This minimizes the opportunities for water and other contaminants to collect within the machine. As will be appreciated, the second fascia portion 22 and baffle structure 164 are symmetrical and thus the exemplary structure enables contaminants to exit from the housing of the machine on both sides of the fascia portion 22.

Figure 9:
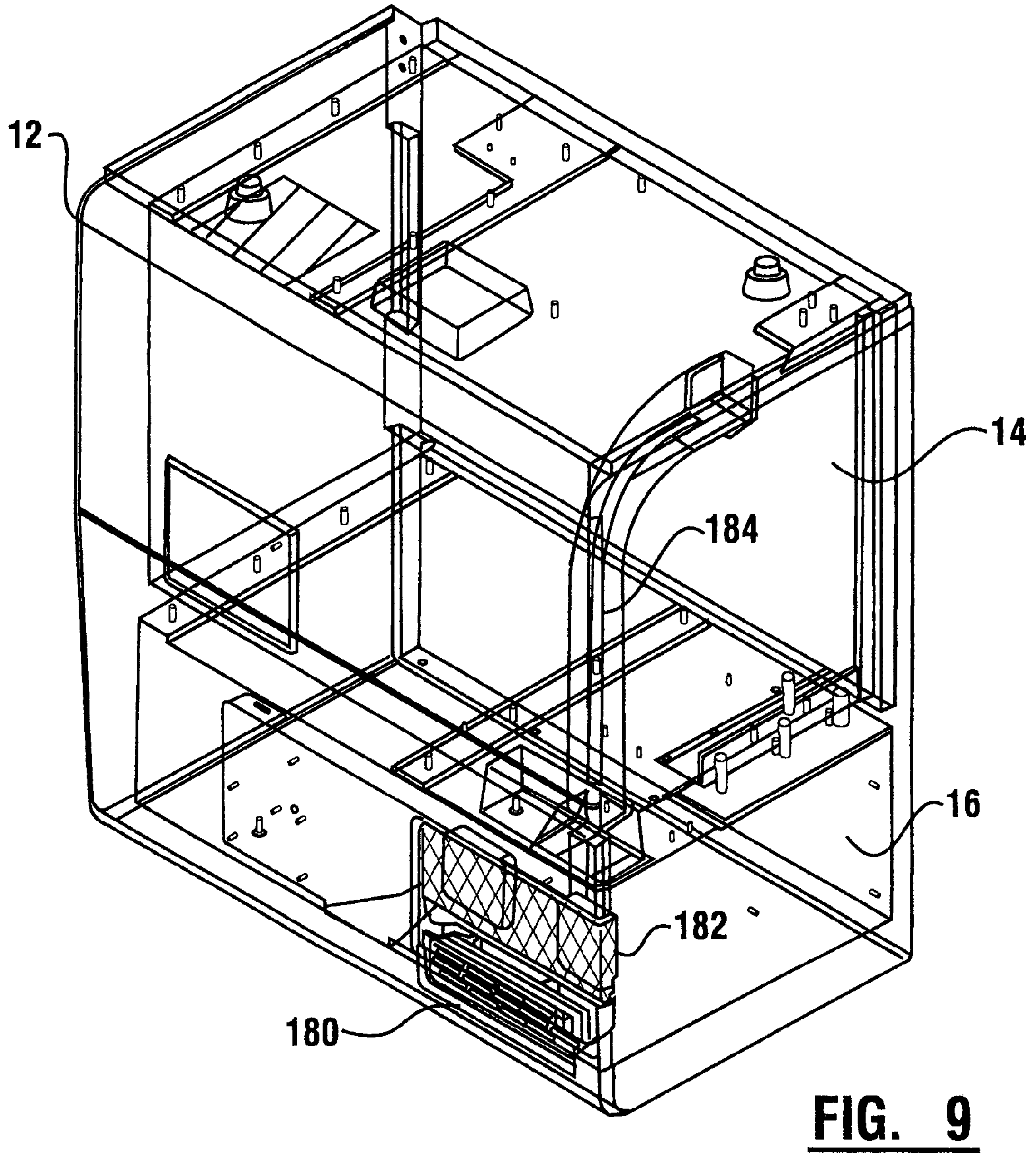
FIG. 9 is a transparent rear isometric view showing blowers, air openings and an air moving duct within a housing of an exemplary embodiment.

As shown in FIG. 9 the exemplary embodiment facilitates air flow through the machine for cooling purposes by providing an air opening 180 at the rear of the chest portion. As can be appreciated the air opening is appropriately protected so as to prevent attack therethrough into the chest area of the housing. The air opening is operatively connected through appropriate filters or other devices to one or more blowers 182. The blowers are operative to provide forced air flow through the housing. In addition in exemplary embodiments heating and cooling devices may also be provided in proximity to the blowers so as to facilitate maintaining appropriate temperatures within the housing. Such devices may include for example, heat pumps, Peltier devices and other suitable devices for cooling, heating or otherwise conditioning air that flows through the housing. Appropriate sensors and other controls may be operated within the housing to maintain the components in the housing within a suitable temperature and/or humidity range.

In the exemplary embodiment a duct 184 is provided between the chest area 16 and the upper housing portion 15. The duct 184 enables air flow between the chest and upper housing portions so as to facilitate the cooling or heating of components in both sections of the housing. As can be appreciated for purposes of maintaining the display in an appropriate temperature condition, air may be passed from the air opening 180 and through the duct 184 into the upper housing area. The positive pressure produced by the blower and the upper housing area causes air flow through the upper housing portion and through the air cooling opening 160. In such circumstances air is directed around the rear and sides of the display 36 past the baffle structure 164 and out the opening 160. Alternatively under appropriate circumstances the blowers may be operated to reverse the air flow in which case the heat generated by a display may be captured within the machine so as to supplement the heating capabilities of heaters within the machine to avoid components from becoming too cold. As can be appreciated in some embodiments the controller of the machine or other controllers may be operated to control the direction and rates of the blowers as well as the heating and cooling devices so as to maintain the interior of the housing within the appropriate temperature range. In the exemplary embodiment the structure of the display, baffle structure and second fascia portion facilitate cooling (and heating) the display and other components while minimizing the risk of the introduction of contaminants into the machine.

As can also be appreciated from the previous discussion, the baffle structure 164 is mounted in generally fixed relation with the housing. As a result the extension of the rollout tray 112 enables the display and other components supported on the tray to be extended outside the housing and away from the baffle so as to facilitate servicing. Once such servicing is conducted the tray and second fascia portion may be retracted so that the display again moves in underlying relation of the baffle and with the baffle extended in intermediate relation between the display and the air cooling opening 160 so as to provide protection. Of course it should be understood that these structures are exemplary and in other embodiments other approaches may be used.

In the exemplary embodiment the ATM 10 is provided with enhanced diagnostic capabilities as well as the ability for servicers to more readily perform remedial and preventive maintenance on the machine. This is accomplished in an exemplary embodiment by programming the controller and/or alternatively distributed controllers and processors associated with the transaction function devices, to sense and capture diagnostic data concerning the operation of the various transaction function devices. In an exemplary embodiment this diagnostic data includes more than an indication of a disabling malfunction. In some embodiments and with regard to some transaction function devices, the data may include for example instances of speed, intensity, deflection, vacuum, force, friction, pressure, sound, vibration, wear or other parameters that may be of significance for purposes of detecting conditions that may be developing with regard to the machine and the transaction function devices contained therein. The nature of the diagnostic data that may be obtained will depend on the particular transaction function devices and the capabilities thereof as well as the programming of the controllers within the machine.

In the exemplary embodiment the controller is operative to process data representative the condition of the various transaction function devices and to store such information in one or more data stores in a protected form. In an exemplary embodiment the protected form of the information is such that persons who are not authorized and do not have a suitable diagnostic article are not able to obtain access to such data. The nature of the protection used for the data may include in some cases encryption, storing such data in a memory device which erases the data in the event of tampering, and/or using other forms of protection so as to prevent access to such data by unauthorized persons.

In an exemplary embodiment authorized servicers are enabled to utilize the diagnostic data and to facilitate remedial and preventive maintenance on the machine by being issued a diagnostic article such as diagnostic article 98 previously mentioned in conjunction with FIG. 4. In the exemplary embodiment the diagnostic article is computer readable media such as a CD which may be operatively engaged with a diagnostic article reading device 96 such as a CD drive. Of course it should be understood that in other embodiments the diagnostic article may have other forms and may include for example a portable terminal such as a PDA or cell phone or may be a portable storage device such as a plug in USB memory module or smart card.

In the exemplary embodiment engaging the diagnostic article in operative connection with the controller enables a servicer to obtain access to the diagnostic data as well as to access information from the article which provides an indication of the significance of the diagnostic data being received. In an exemplary embodiment the diagnostic article includes service manual data which can be output through an output device of the ATM or other terminal, and which a servicer can utilize in a manner similar to repair instructions and other information which are usable to conduct servicing operations on the ATM. Further, in an exemplary embodiment, the diagnostic article includes diagnostic instructions that are operative to interpret results of diagnostic tests or operations that can be performed through operation of the controller.

In the exemplary embodiment the diagnostic article includes instructions which may be utilized by and interact with the controller of the machine. This enables the servicer to utilize the diagnostic data as well as service data from the diagnostic article to provide output indicia through an output device which may suggest to a servicer certain diagnostic tests. The controller may then be operated to enable a user to provide inputs through one or more input devices of the machine corresponding to such diagnostic tests. These diagnostic instructions which are included in the service data on the diagnostic article cause the controller to interact with the transaction function devices and to produce one or more results. Responsive to such results the controller in the machine is operative to cause the output of indicia which may indicate the result(s) to a servicer. Further responsive to the result(s) and the service data on the diagnostic article, the controller may operate to cause the output of indicia corresponding to other diagnostic tests which may be conducted as well as service or remedial actions which a servicer should consider taking in order to fix existing problems or minimize the risk of future ones. In an exemplary embodiment the service data included in the diagnostic article can be used to guide a servicer through service activities as well as to interact with the controller and provide servicer interaction at the machine so as to obtain test results and enable diagnosis of conditions within the machine. In addition, the exemplary embodiment of the service article when in operative connection with the controller, enables the output of indicia which may comprise textual, aural or graphical information so as to facilitate servicing activities at the machine by the servicer.

In the exemplary embodiment of the service article, the article provides to the controller one or more secret codes, commands, results or other things, all of which are referred to herein for brevity as secret codes. Such secret codes are analyzed through operation of the controller to determine if the diagnostic article is authorized. In some embodiments the controller may operate to require a user to input information which is utilized in making a determination as to whether the article is authorized. Such input user information may include for example, input codes to input devices on the machine or biometric inputs. In addition or in the alternative the secret codes which are derived from the diagnostic article may be time, machine or device specific. For example, the particular diagnostic article may have secret codes which indicate that it is operative only during certain time periods or before or after a particular date. The controller in the ATM may operate to carry out a calendar function which provides a current date. The ATM controller may utilize the secret codes from the diagnostic article to produce one or more values which are compared to verification data which is produced responsive to time or date data so as to produce a comparison result. The controller may thereafter enable the output of diagnostic data or significance data for the performance of activities based on the comparison result indicating that the diagnostic article and/or user are authorized.

In some exemplary embodiments the service data included in the diagnostic article may be encrypted. Such encryption may include various standard or nonstandard techniques so as to reduce the risk of unauthorized users being able to access such service data. In the exemplary embodiment the controller at the ATM is operative to decrypt the service data so as to enable its utilization in conducting diagnostic activities and to enable the output of indicia corresponding thereto through output devices either on the machine or through an output device at a separate terminal.

Further in some exemplary embodiments the diagnostic article may include browser software. Such browser software may be loaded to the controller in the ATM and may be operative therein to provide output indicia as a result of processing the service data through the browser. In some embodiments such a browser may be programmed to interpret embedded instructions in the service data that do not conform to published standards and/or which are generally nonpublic. Such embedded instructions may be processed by the browser so as to output indicia usable in servicing the machine as well as to cause the controller to interact with transaction function devices within the machine so as to conduct diagnostic activities. The use of such nonstandard browser software further enhances security associated with the diagnostic article as well as the machine.

In addition in some embodiments the diagnostic article and/or the data stored in the ATM may contain instructions so as to prevent continued operation of the browser software and/or retention of the service data from the diagnostic article in memory after the diagnostic article is operatively disconnected from the controller. Such instructions may be utilized to minimize the risk that service data from the diagnostic article, the browser software or other instructions contained therein, continue to be operational in the machine after the authorized servicer has removed the diagnostic article from operative connection with the controller.

In addition in some exemplary embodiments the diagnostic article may be configured such that it may be used in conjunction with computer devices other than an automated banking machine. For example in circumstances where the diagnostic article includes service manual data, authorized users may be able to utilize the diagnostic article to obtain electronic service manual documentation from a computing device such as a notebook computer, PDA or cell phone. In such circumstances diagnostic instructions included in the diagnostic article that would otherwise interact with the machine controller and/or transaction function devices included in the ATM, will not be operative in another type of computing device. In such exemplary embodiments it may be appropriate however to prevent access to the service manual data contained on the diagnostic article unless the secret codes are determined to be appropriate through correspondence with time data inputs from a user or other appropriate verification data which indicates that access to the service manual data is authorized.

It should be understood that these approaches and techniques are exemplary and in other embodiments other approaches, techniques and capabilities may be used.

Figure 12:
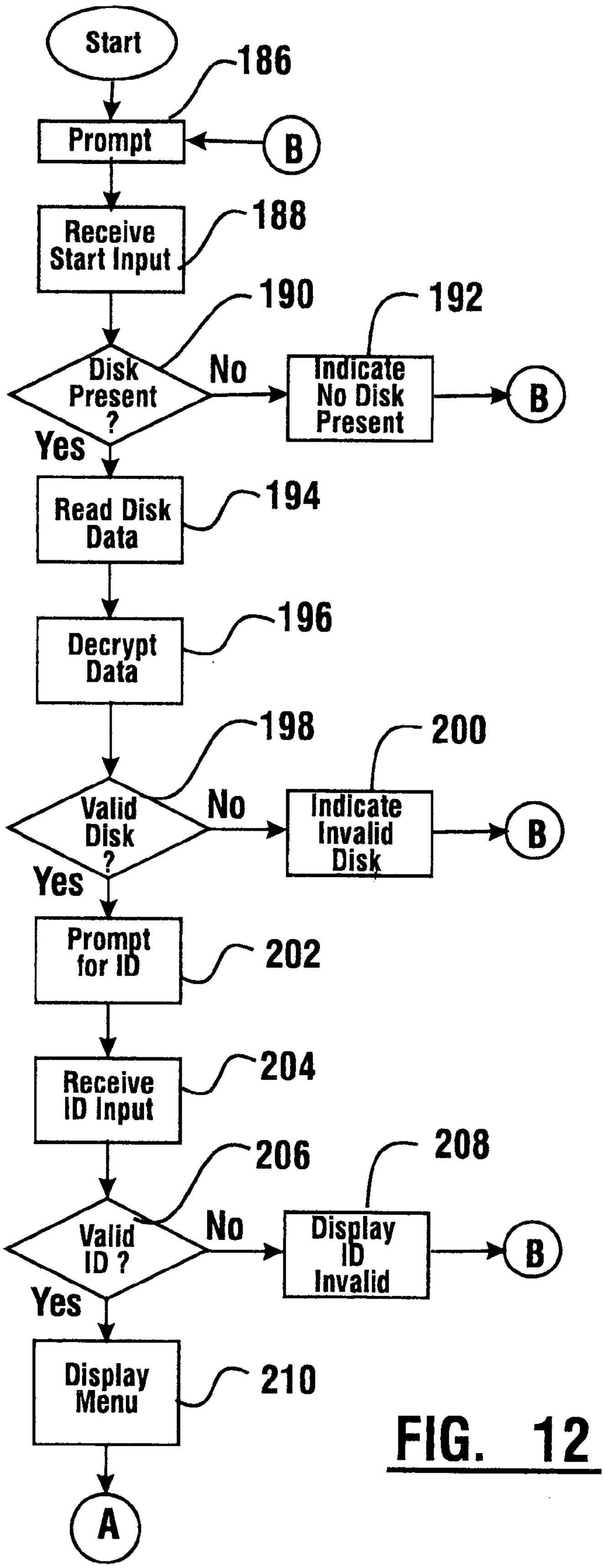
FIG. 12 and FIG. 13 is a schematic view showing exemplary logic that may be used in servicing the machine through use of a diagnostic article.
Figure 13:
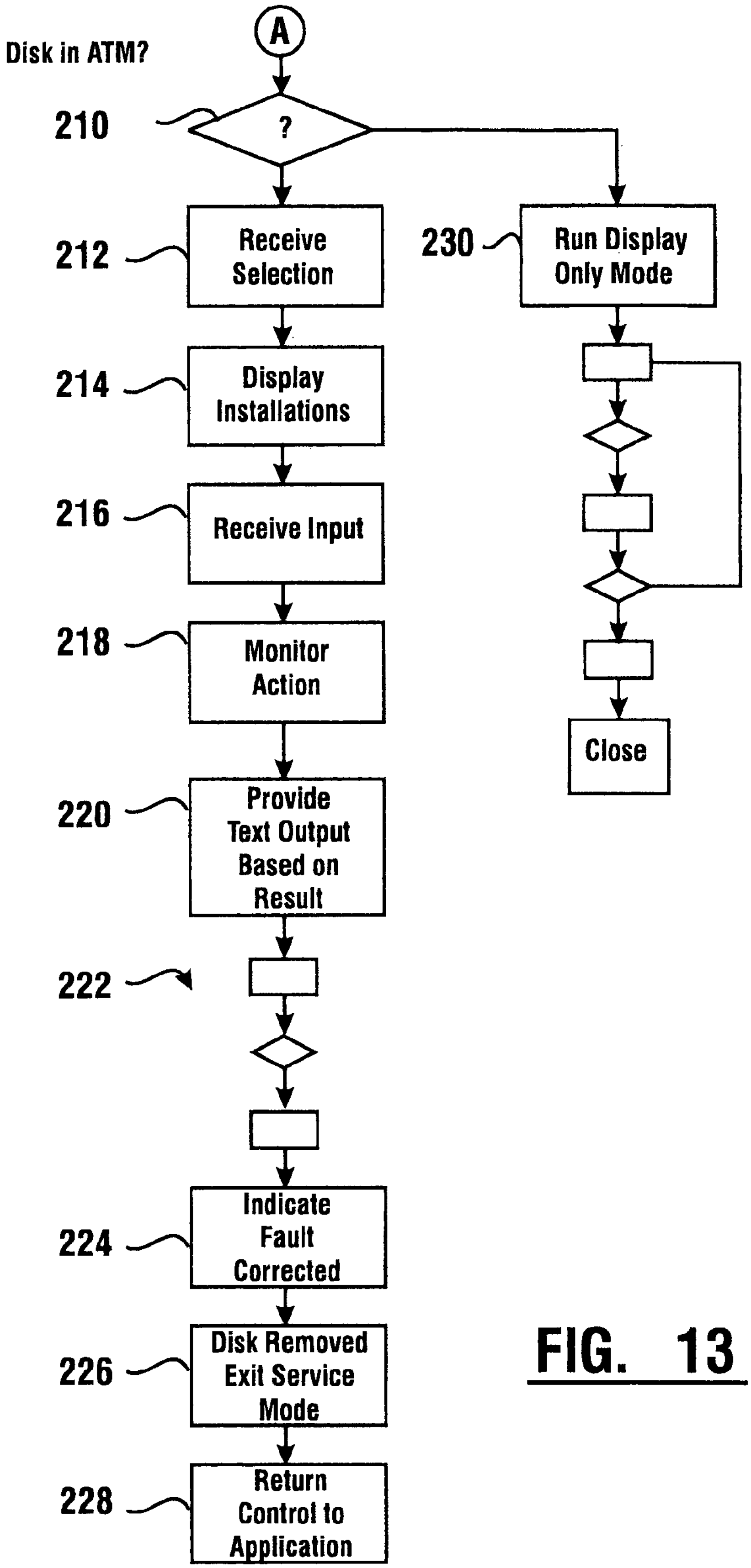

FIGS. 12 and 13 show an exemplary schematic logic flow associated with verifying the authorized character of the diagnostic article such as a CD in an ATM. It should be appreciated that in the exemplary embodiment the diagnostic article reading device such as the exemplary CD reader 96 will generally be positioned within the housing of the ATM and may be within the secure chest so that only authorized service personnel are able to gain access thereto. This may further help to assure that only those who may properly gain access to the interior portions of the housing may conduct the service activity which may include being able to access valuable documents, sensitive customer data or other information.

As represented in FIG. 12, once a servicer has gained access to the diagnostic article reading device, the controller may operate in a step 186 to provide output indicia through an output device of the ATM prompting a servicer to provide an input to enter a diagnostics mode. If in a step 188 an input to enter the diagnostics mode is provided, the controller is then operative to check if a diagnostic article disk is present in a step 190. If no disk is present in the diagnostic article reading device, the controller is operative to provide indicia through an output device indicating to the service user that no disk is present. This is done at a step 192 when the controller returns the logic to the prompting step 186.

If a diagnostic article is determined to be present in a step 190, the controller is operative to cause data to be read from the article in a step 194. In the exemplary embodiment the diagnostic article provides secret codes which are also encrypted and the controller is operative to decrypt the data to a usable form in a step 196. In step 196 the controller is operative to compare data corresponding to at least one of the secret codes for verification data for purposes of making a determination as to whether the diagnostic article is valid. This is done in a step 198. As previously discussed, the verification data in various embodiments may be derived from information stored in memory in the machine, date data, inputs provided by a user or other data which is operative to generally reliably verify that the diagnostic article is authorized and is being used within the scope of its permitted use. If in step 198 it is determined that the diagnostic article is invalid, indicia is output to the user through an output device of the machine to indicate that the diagnostic article is invalid. This is done at a step 200 and the logic returns to the prompting step.

If in step 198 the disk is determined to be valid, the exemplary embodiment causes the controller to operate in accordance with its programming to provide output indicia which prompts the user to input ID data. This is done at a step 202. The user then provides at least one input to at least one input device on the ATM at a step 204. The controller is then operative to cause a verification step 206 to be executed to determine if the ID input by the user is valid. In various embodiments the determination as to whether the user ID is valid may be based on the secret code data, date data, stored data or combinations or relationships thereof which operate to assure that access is limited to authorized users. If the input from the user is determined not to be valid, the controller is operative to output indicia indicative thereof to an output device as represented at a step 208 when the controller returns the logic flow.

If the user ID data input is valid as determined in step 206, the controller is operative to read the diagnostic article. As previously discussed in some embodiments this may include loading browser software from the diagnostic article into a memory in operative connection with the controller. Alternatively or in addition this may also involve decrypting encrypted service data or instructions from the diagnostic article. In the exemplary embodiment such activities are carried out and the controller operates to display a menu responsive to the service data included on the diagnostic article. This is done in a step 210.

In the exemplary embodiment of the diagnostic article, the controller in the ATM or the processor of the computer device in cases where the diagnostic article is not being used in the ATM, is operative to operate to execute a testing step to determine if the diagnostic article is in operative connection with an ATM. This is represented as a step 210 in FIG. 13. In the exemplary embodiment the diagnostic article contains instructions which enable the accessing of diagnostic data stored in the ATM and enable the utilization thereof in connection with conducting service activities. If such diagnostic data and transaction function devices are not present in a computing device, because it is not an ATM, logic flow which may be derived at least in part from instructions on the diagnostic article, varies to accommodate use in the non-ATM computing device. For purposes of carrying on the description of the logic flow it will be presumed that the determination in step 210 properly indicates in the circumstances described that the diagnostic article is in operative connection with the ATM. This then causes the controller in the ATM to operate responsive to the diagnostic article to render diagnostic data accessible as well as to provide output indicia corresponding to menu options and selections which are available for conducting activities at the ATM.

Responsive to the outputs produced responsive to operation of the controller through output devices on the ATM, and which provide options for the servicer, the servicer then makes appropriate selections as represented in a step 212. This may include for example a selection indicating that the servicer wants to determine the nature of any anomalies which currently exist or which have existed in the operation of transaction function devices in the ATMs. Of course other options for the servicer may also be provided in accordance with the programming of the controller and instructions on the diagnostic article.

In response to a user indicating that they wish to receive information about malfunctions or anomalies in the operation of the ATM, the controller is operative to cause indicia to be output through an output device on the machine corresponding to such information as well as suggested diagnostic tests that could be performed at the ATM in order to determine the cause or nature of the malfunction or anomaly. This is represented in a step 214. In response to the output the servicer provides an input indicative of the action that the servicer wishes to have conducted. This input may be provided through one or more input devices on the ATM. Such input devices may be included in a special servicer interface, but in some embodiments input devices of the ATM generally used by consumers may be used for this purpose.

Inputs from the servicer in step 216 would generally cause the controller to interact with one or more transaction function devices to carry out a diagnostic test and to receive at least one result of the test. This is represented by a step 218. Responsive to the result of the diagnostic test, the controller is operative responsive to the service data to provide output indicia to the servicer. This output indicia may include information on the outcome of the test or may indicate that further tests should be conducted. This is represented by a step 220. Such further steps may be carried out as appropriate for purposes of diagnosing the particular condition(s) of interest in the machine. These further steps may involve in the exemplary embodiment, receiving instructions from the servicer. The controller responsive thereto, interacts with the transaction function devices in the machine and the service data from the diagnostic article so as to direct the diagnostic activities. Such activities are schematically represented through a series of steps indicated 222.

By the controller operating responsive to the service data and the diagnostic data, the fault or other condition which is sought to be detected, corrected or otherwise addressed will be accomplished. This is represented in a step 224. Once this is accomplished in the exemplary embodiment, a servicer may conduct additional diagnostic activity by interacting with the machine. However, in this exemplary series of steps, it will be considered that the servicer has completed his activities and wishes to return the machine to service. In doing this the servicer will provide appropriate inputs to the machine and will remove the diagnostic article from operative connection with the controller. This is represented in a step 226. Such action is operative to take the ATM out of the diagnostics mode and to again prevent access to diagnostic data within the machine. Such action will also generally cease the operation of the special browser software associated with the service article as well as diagnostic programs which are only operated when the service article is engaged with the machine. Thereafter the controller operates to return control of the ATM machine to the application. This is represented in a step 228.

As can be appreciated, the exemplary embodiment provides for the service data such as diagnostic instructions and other diagnostic activities that may be described in service manuals or other instructions or data, to interact with the controller of the machine. In the exemplary embodiment this enables a servicer not only to receive indicia corresponding to what a servicer should do in order to conduct a particular test, but also to provide instructions to the controller based on the service data so that the controller can conduct a test. Further in appropriate situations, the result of the test may be utilized to direct a servicer within the service data to the appropriate remedial action or to conduct a different test so as to complete the servicing activity as quickly as possible. Such capabilities particularly when combined with the availability of the diagnostic data concerning transaction function devices stored in the machine, enables more accurate and rapid identification and correction of problems so that the machine may be returned to service.

As previously mentioned in the exemplary embodiment provision is also made such that the diagnostic article may be operated as an electronic service manual within a computer device other than an ATM.

As shown in FIGS. 12 and 13, access to service data included on the service article may be restricted in a manner similar to that provided when the service article is used in conjunction with an ATM. This is done through appropriate programming and interaction with a non-ATM computer device. However, as indicated in step 210, when it is determined that the service article is not operating within an ATM, the exemplary service article operates in a display mode only as indicated at a step 230. In the display mode the service data is provided to a user in a manner similar to an electronic service manual. Thus the user may be able to browse selectively through the information reviewing the textual material and diagrams associated therewith. However, when the diagnostic article is operated in display mode only, diagnostic instructions that would otherwise cause the controller of the ATM to interact with transaction function devices are not operative to perform functions within the computer devices. It should be appreciated, however, that being able to use the exemplary diagnostic article in conjunction with another type of computer device may facilitate servicing in some circumstances. In some embodiments the controller may be programmed to provide network access to diagnostic capabilities to a remote computer device. Such capabilities may be provided in some circumstances when the diagnostic article is installed or otherwise operative in the remote computer device. This may avoid the need in some embodiments for a servicer to travel to the machine to physically connect the diagnostic article in operative connection with an article reading device such as a reader. Rather, the diagnostic activities may be conducted remotely so as to facilitate identifying any issues and minimizing machine downtime.

It should be understood that although in the exemplary embodiment the diagnostic article is described as a CD or other read-only device, in other embodiments the diagnostic article may be another type of device. This may include, for example, a portable terminal such as a notebook computer, PDA, cell phone or other suitable article which can be verified as genuine and which can provide the service data and the instructions to facilitate carrying out diagnostic activities.

In some alternative embodiments the diagnostic article may be utilized in a system that enables remote communication with the ATM. For example, the diagnostic article may be utilized in conjunction with a remote computer that is operatively connected to the ATM through a network. In some examples the operation and logic may be similar to that previously described except that instead of the diagnostic article being adjacent to the ATM it communicates with the ATM controller through the network. In some embodiments the messages through the network may be encrypted to provide enhanced security.

For example in some embodiments the controller may be programmed so that a diagnostic article which is a CD, hard disk or other computer readable media resides on a computer remote from the ATM. The remote computer includes output and input devices that operate to provide outputs and inputs similar to that previously described when diagnosing conditions at the ATM. In this way a remote servicer may diagnose and possibly change, adjust or correct conditions at the ATM. In some embodiments the service manual data and diagnostic data may also be utilized by the remote servicer in conjunction with the service activities. The one or more secret codes or other means used to gain access to diagnostic data and other values or functions may be those from the diagnostic article and/or inputs by the user to the remote computer, or may be a function of other values from the user and/or remote computing device. In some embodiments the ability to conduct service activity locally or remotely may be provided to facilitate servicing of the ATM.

Thus, the features and characteristics of the embodiments previously described achieve desirable results, eliminate difficulties encountered in the use of prior devices and systems, solve problems and may attain one or more of the objectives stated above.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. An automated banking machine apparatus comprising:

a housing;

a user interface in supporting connection with the housing, the user interface including at least one input device and at least one output device, wherein the at least one input device includes a card reader having an associated card reader slot adapted to accept cards input by users of the apparatus;

at least one radiation emitting device positioned adjacent the slot, wherein the at least one radiation emitting device is operative to emit radiation;

at least one radiation sensing device adjacent the slot, wherein both with and without an unauthorized card reading device positioned adjacent the slot the at least one radiation sensing device is operative to sense radiation emitted from the at least one radiation emitting device such that positioning an unauthorized card reading device adjacent the slot causes a sensed change in at least one property of radiation from the at least one radiation emitting device;

at least one controller in the housing, wherein the at least one controller is in operative connection with the at least one radiation sensing device and is operative to generate at least one signal responsive to the change, whereby installation of an unauthorized card reading device adjacent the slot is indicated.

2. The apparatus according to claim 1 and further comprising a currency dispensing device in supporting connection with the housing.

3. The apparatus according to claim 2 wherein the at least one radiation emitting device is operative to emit visible light.

4. The apparatus according to claim 3 wherein the at least one radiation emitting device is adapted to surroundingly illuminate the card reader slot.

5. The apparatus according to claim 2 wherein the controller is operative to cause the apparatus to carry out a currency dispensing transaction, and wherein the controller is operative to cause the at least one radiation emitting device to initiate emitting radiation during at least one of a transaction step when a user card is to be inserted in the slot and a further transaction step when a user card is to be taken from the slot.

6. The apparatus according to claim 5 and further comprising at least one data store, wherein the controller is operative to cause at least one stored value corresponding to the at least one property of radiation sensed by the at least one radiation sensing device to be stored in the data store.

7. The apparatus according to claim 6 wherein the controller is operative to compare the at least one stored value with at least one current value corresponding to the at least one property of radiation currently sensed by the at least one radiation sensing device.

8. The apparatus according to claim 7 wherein the controller is operative responsive to determining a difference when comparing the at least one stored value to the at least one current value to cause a status message to be sent by the machine to a remote computer.

9. The apparatus according to claim 7 wherein the controller is operative responsive to determining a difference when comparing the at least one stored value to the at least one current value to cause an output message to be output through at least one output device on the user interface.

10. The apparatus according to claim 9 wherein the output message advises of a possible object near the slot.

11. The apparatus according to claim 7 wherein the controller is operative to change the at least one stored value responsive to the at least one current value.

12. The apparatus according to claim 7 wherein the controller is operative to compare the at least one stored value with the at least one current value at a time when a transaction is not being conducted by a user at the apparatus.

13. The apparatus according to claim 7 wherein the controller is operative to execute fuzzy logic in comparing the at least one current value with the at least one stored value.

14. The apparatus according to claim 1 and further comprising a housing member bounding at least one side of the card reader slot, and wherein the at least one radiation emitting device and the at least one radiation sensing device are mounted in supporting connection with the housing member.

15. The apparatus according to claim 14 wherein the housing member extends in surrounding relation of the card reader slot.

16. An automated banking machine apparatus comprising:

a housing;

a user interface in supporting connection with the housing, wherein the user interface includes at least one input device and at least one output device, wherein the at least one input device includes a card reader having an associated card reader slot adapted to accept cards input by users of the machine;

at least one radiation emitting device;

at least one sensing device, wherein the at least one sensing device is adapted to sense an unauthorized card reading device positioned adjacent the card reader slot;

at least one controller in the housing and in operative connection with the at least one radiation emitting device and the at least one sensing device, wherein the controller is operative to cause prompting of a user to move a card in the slot, wherein the at least one controller is operative to selectively cause operation of the at least one radiation emitting device, wherein the operation is dependent on the prompting, wherein the at least one controller is operative to cause at least one output responsive to a sensing of an unauthorized card reading device.

17. The apparatus according to claim 16 wherein the at least one sensing device comprises at least one radiation sensing device.

18. The apparatus according to claim 17 wherein the at least one sensing device and the at least one radiation emitting device are both positioned adjacent the card reader slot, wherein the at least one radiation sensing device is adapted to sense radiation emitted by the at least one radiation emitting device.

19. The apparatus according to claim 16 wherein the at least one controller is in operative connection with at least one data store, and wherein the at least one controller is operative to cause to be stored in the at least one data store at least one stored value responsive to at least one signal from the at least one sensing device, compare the at least one stored value to at least one current value corresponding to at least one signal currently produced by the at least one sensing device, and produce the at least one output responsive to a result of the comparison.

20. The apparatus according to claim 19 wherein the at least one controller is further operative to cause the at least one stored value to be changed responsive to the at least one current value.

21. The apparatus according to claim 16 wherein the at least one output comprises a status message.

22. An automated banking machine apparatus comprising:

a user interface, a slot member on the user interface and bounding at least one side of a slot, at least one sensor device positioned to detect an unauthorized object placed adjacent the user interface, wherein the at least one sensor device includes at least one radiation emitting device and at least one radiation sensing device mounted in supporting connection with the slot member, wherein both with and without an unauthorized object placed adjacent the user interface, the at least one radiation sensing device is operative to sense radiation emitted from the at least one radiation emitting device, at least one controller, wherein the at least one controller is operative to selectively control the at least one sensor device.

23. The apparatus according to claim 22 wherein at least one radiation emitting device and at least one radiation sensing device are mounted on opposite sides of the slot.

24. The apparatus according to claim 23 wherein the slot comprises a card slot, wherein the slot member extends in generally surrounding relation of the card slot, and the at least one radiation emitting device is operative to visibly illuminate an area surrounding the card slot.

25. An automated banking machine apparatus comprising:

a housing, a user interface in supporting connection with the housing, the user interface including at least one input device and at least one output device, wherein the at least one input device includes a card reader having an associated card reader slot adapted to accept cards input by users of the machine, at least one sensing device positioned adjacent the card reader slot, wherein the at least one sensing device is adapted to sense an unauthorized card reading device positioned adjacent the card reader slot, at least one controller in the housing and in operative connection with the at least one sensing device, wherein the at least one controller is operative to execute fuzzy logic in comparing at least one stored value and at least one current value corresponding to at least one signal currently produced by the at least one sensing device, and wherein the at least one controller is operative to produce at least one output responsive to a result of the comparison.

26. A method comprising:

(a) sensing with at least one sensing device adjacent to a card reader slot of a user interface of an automated banking machine, an unauthorized card reader device attached to the user interface, wherein the sensing includes emitting radiation with at least one emitting device located adjacent the slot;

wherein the sensing includes sensing radiation from the at least one emitting device with at least one radiation sensor device located adjacent the slot and the at least one emitting device;

wherein both with and without an unauthorized card reader device attached to the user interface, the at least one radiation sensing device is operative to sense radiation emitted from the at least one radiation emitting device, wherein the sensing device is selectively controlled by at least one controller of the machine;

(b) responsive to sensing the unauthorized card reader device, providing at least one output from the machine.

27. The method according to claim 26 wherein step (b) comprises sending a status message from the machine.

28. The apparatus according to claim 26 wherein step (b) comprises providing a notice indicating presence of a possible unauthorized reader device to a user of the machine through at least one output device.

29. The method according to claim 26 wherein at least one emitting device and at least one radiation sensor device are arranged on opposite sides of the slot, and wherein step (a) comprises:

sensing radiation emitted from an opposite side of the slot.

30. The apparatus according to claim 29 wherein step (a) further comprises:

comparing at least one property of radiation sensed from the at least one sensor device to at least one stored value.

31. The method according to claim 30 and further comprising:

(c) operating the at least one radiation emitting device when no unauthorized card reader device is sensed;

(d) sensing radiation emitted in step (c) with at least one radiation sensor device;

(e) changing the at least one stored value responsive to radiation sensed in step (d).

32. The method according to claim 26 wherein the at least one emitting device emits visible light during operation, and further comprising:

(c) operating the at least one emitting device when the machine conducts a transaction step in which a card is to be removed from the slot.

33. The method according to claim 32 and prior to step (c) further comprising:

dispensing currency from the machine, and wherein in step (c) the at least one emitting device illuminates the slot in generally surrounding relation.

34. A method comprising:

(a) operating at least one sensing device adjacent to a card reader slot of a user interface of an automated banking machine;

(b) executing fuzzy logic in comparing at least one property of a sensing with the at least one sensing device to at least one stored value in determining whether an unauthorized card reader device is attached to the user interface; and (c) responsive to determining an unauthorized card reader device is attached, providing at least one output from the machine.

* * * * *